United States Patent
Satoh et al.

(10) Patent No.: US 11,641,492 B2
(45) Date of Patent: May 2, 2023

(54) IMAGE PROCESSING APPARATUS AND IMAGE PROCESSING METHOD

(71) Applicant: Sony Corporation, Tokyo (JP)

(72) Inventors: Ryuta Satoh, Kanagawa (JP); Suguru Aoki, Tokyo (JP); Atsushi Ito, Kanagawa (JP); Takeshi Uemori, Tokyo (JP); Hideki Oyaizu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 386 days.

(21) Appl. No.: 16/767,596

(22) PCT Filed: Sep. 4, 2018

(86) PCT No.: PCT/JP2018/032719
§ 371 (c)(1),
(2) Date: May 28, 2020

(87) PCT Pub. No.: WO2019/111464
PCT Pub. Date: Jun. 13, 2019

(65) Prior Publication Data
US 2020/0410274 A1    Dec. 31, 2020

(30) Foreign Application Priority Data

Dec. 4, 2017 (JP) .............................. JP2017-232968

(51) Int. Cl.
*G06V 10/25* (2022.01)
*G06T 11/00* (2006.01)
(Continued)

(52) U.S. Cl.
CPC .............. *G06V 10/25* (2022.01); *G06T 11/00* (2013.01); *G06V 10/507* (2022.01); *G06V 20/58* (2022.01);
(Continued)

(58) Field of Classification Search
CPC ...... G06V 10/25; G06V 10/507; G06V 20/58; G06V 40/103; G06T 11/00;
(Continued)

(56) References Cited

U.S. PATENT DOCUMENTS

2006/0093209 A1* 5/2006 Guetter ..................... G06T 7/33
382/159
2007/0222565 A1* 9/2007 Kawamata ............. G06V 20/58
348/148

(Continued)

FOREIGN PATENT DOCUMENTS

| CN | 101202845 A | 6/2008 |
|---|---|---|
| CN | 101335841 A | 12/2008 |

(Continued)

OTHER PUBLICATIONS

Fang Y et al: "A Shape-Independent Method for Pedestrian Detection With Far-Infrared Images", IEEE Transactions on Vehicular Technology, IEEE Service Center, Piscataway, NJ, US,vol. 53, No. 6, Nov. 1, 2004 (Nov. 1, 2004), pp. 1679-1697, XP011122458, ISSN: 0018-9545, DOI:10.1109/TVT.2004.834875.

(Continued)

*Primary Examiner* — Stephen P Coleman
(74) *Attorney, Agent, or Firm* — Xsensus LLP

(57) ABSTRACT

Provided are an image processing apparatus and an image processing method that process a far-infrared image.
The image processing apparatus includes a region extraction section, a modal transformation section, and a superimposition section. The region extraction section extracts a region of interest within a visible-light image captured by a visible-light camera. The modal transformation section receives an image of the region of interest within an infrared image captured by an infrared camera observing the same subject as the visible-light camera, and transforms the received image to a modal image. The superimposition section gen- (Continued)

erates a presentation image by superimposing the modal image on the region of interest within the visible-light image. The modal transformation section transforms a far-infrared image of the region of interest to a modal image including an information modal familiar to humans by using, for example, a database and a conditional probability distribution.

20 Claims, 13 Drawing Sheets

(51) Int. Cl.
    *G06V 10/50*     (2022.01)
    *G06V 20/58*     (2022.01)
    *G06V 40/10*     (2022.01)
(52) U.S. Cl.
    CPC .. *G06V 40/103* (2022.01); *G06T 2207/10048* (2013.01); *G06T 2207/30196* (2013.01)
(58) Field of Classification Search
    CPC . G06T 2207/10048; G06T 2207/30196; G06T 1/0007; G06T 5/50; G06T 5/40; H04N 5/23218; H04N 5/2351; H04N 5/265; H04N 21/23418; H04N 5/2258; H04N 5/332; H04N 7/188; G08G 1/16
    USPC ......................................................... 382/103
    See application file for complete search history.

(56) References Cited

U.S. PATENT DOCUMENTS

| | | | | |
|---|---|---|---|---|
| 2008/0211916 | A1* | 9/2008 | Ono | G08B 13/19643 348/E5.09 |
| 2009/0097707 | A1* | 4/2009 | Yi | G06V 40/161 382/103 |
| 2013/0229513 | A1 | 9/2013 | Ichitani | |
| 2013/0250070 | A1* | 9/2013 | Takayama | H04N 5/272 348/47 |
| 2016/0196653 | A1* | 7/2016 | Grant | H04N 5/2258 382/294 |
| 2017/0034456 | A1 | 2/2017 | Kyung | |

FOREIGN PATENT DOCUMENTS

| | | | |
|---|---|---|---|
| CN | 103188988 | A | 7/2013 |
| CN | 103582906 | A | 2/2014 |
| CN | 103778618 | A | 5/2014 |
| CN | 103996182 | A | 8/2014 |
| CN | 104935822 | A | 9/2015 |
| CN | 105069768 | A | 11/2015 |
| CN | 105447838 | A | 3/2016 |
| JP | 2005-223605 | A | 8/2005 |
| JP | 2006-338594 | A | 12/2006 |
| JP | 2009-010447 | A | 1/2009 |
| JP | 2010278817 | A | 12/2010 |
| JP | 2013-042404 | A | 2/2013 |
| JP | 2014-191668 | A | 10/2014 |
| KR | 20170093490 | A | 8/2017 |
| WO | 2012/073722 | A1 | 6/2012 |
| WO | 2012/164729 | A1 | 12/2012 |

OTHER PUBLICATIONS

Jan Thomanek et al: "Comparing Visual Data Fusion Techniques Using FIR and Visible Light Sensors to Improve Pedestrian Detection", 2011 International Conference on Digital Image Computing: Techniques and Applications, Dec. 1, 2011 (Dec. 1, 2011), pp. 119-125, XP055073900, DOI: 10.1109/DICTA.2011.27 ISBN: 978-0-76-954588-2, p. 119-p. 122.

International Search Report and Written Opinion dated Nov. 6, 2018 for PCT/JP2018/032719 filed on Sep. 4, 2018, 10 pages including English Translation of the International Search Report.

Li Yanmei et al., "Infrared and visual image fusion enhancement by dual-transform", Application Research of Computers, vol. 30 No. 10, Oct. 2013.

\* cited by examiner

F I G . 2
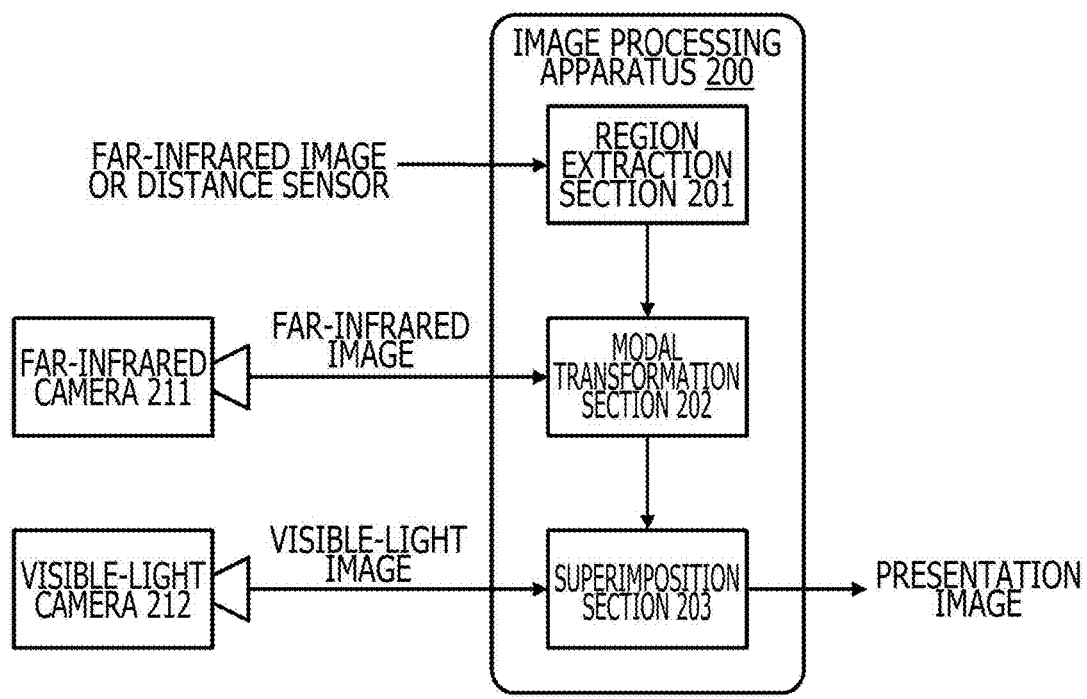

(A)   (B)

p(RGB|FIR)

(C)

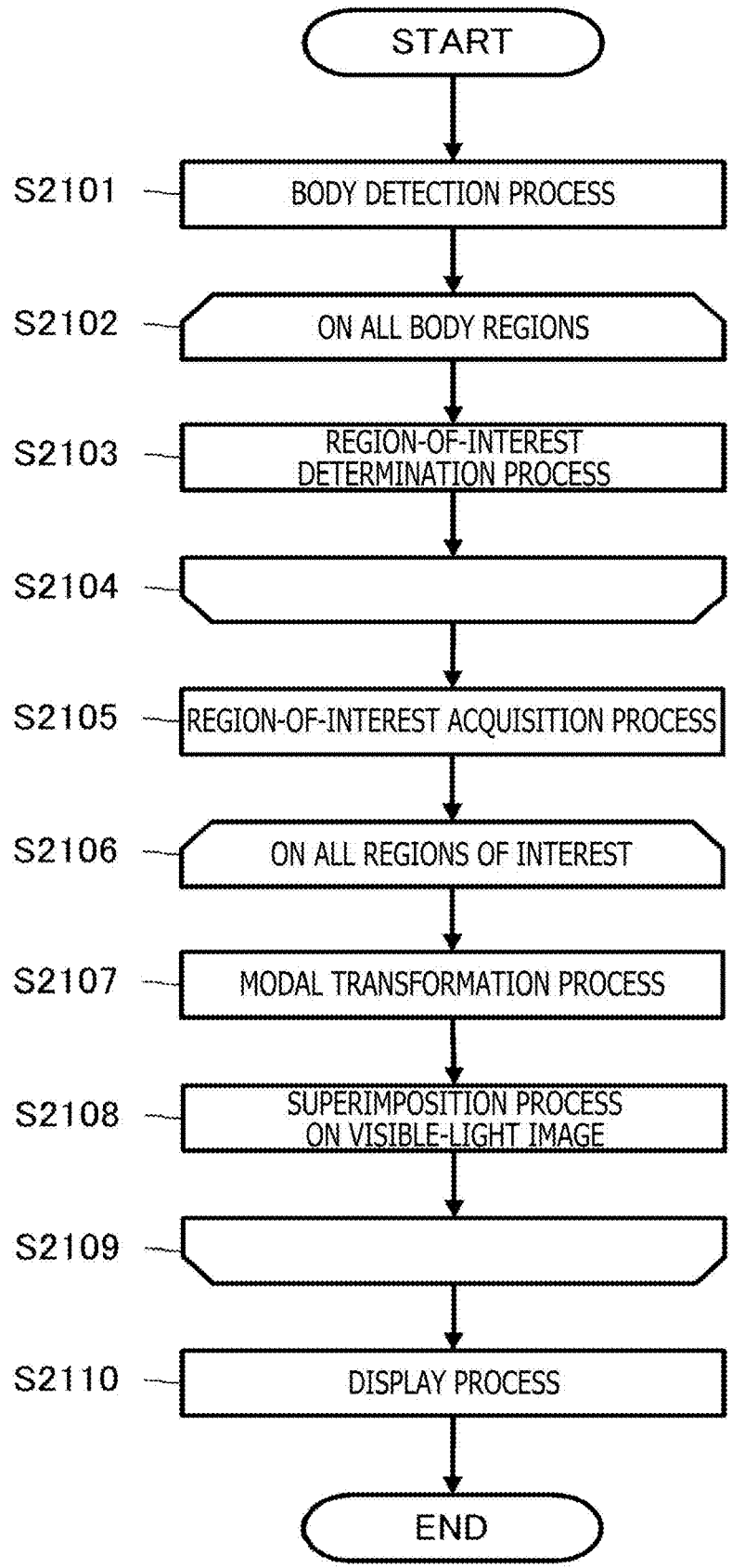

IMAGE PROCESSING APPARATUS AND IMAGE PROCESSING METHOD

CROSS-REFERENCE TO RELATED APPLICATIONS

The present application is based on PCT filing PCT/JP2018/032719, filed Sep. 4, 2018, which claims priority to JP 2017-232968, filed Dec. 4, 2017, the entire contents of each are incorporated herein by reference.

TECHNICAL FIELD

The technology disclosed in this document relates to an image processing apparatus and an image processing method that process far-infrared images.

BACKGROUND ART

In recent years, automotive driving technologies are being vigorously developed. For example, some of developed technologies avoid obstacles by detecting persons and other obstacles ahead of a host vehicle through the use of a visible-light camera and a distance sensor and applying an automatic brake. Obviously, similar technologies can also be applied to estimate the possibility of collision between the host vehicle and persons and other obstacles present on a rear or lateral side of the host vehicle.

Further, it is necessary to prevent traffic accidents all day and all night. Therefore, for example, a hybrid camera (refer, for example, to PTL 1) including a visible-light camera and a far-infrared camera may be used in some cases. The hybrid camera is able to selectively use the visible-light camera or the far-infrared camera depending on an imaging environment that varies, for example, from day to night and from bright and dark. Using the far-infrared camera makes it possible to capture a far-infrared image including a large amount of thermal information at a long wavelength in the vicinity, for example, of ten micrometers, and extract a temperature region near a human body temperature.

CITATION LIST

Patent Literature

[PTL 1]
  JP 2009-10447A
[PTL 2]
  JP 2005-223605A

SUMMARY

Technical Problem

An object of the technology disclosed in this document is to provide an image processing apparatus and an image processing method that process far-infrared images.

Solution to Problem

According to a first aspect of the technology disclosed in this document, there is provided an image processing apparatus including a region extraction section, a modal transformation section, and a superimposition section. The region extraction section extracts a region of interest within a visible-light image captured by a visible-light camera. The modal transformation section receives an image of the region of interest within an infrared image captured by an infrared camera observing the same subject as the visible-light camera, and transforms the received image to a modal image. The superimposition section generates a presentation image by superimposing the modal image on the region of interest within the visible-light image.

The modal transformation section performs transformation to obtain a modal image that includes an information modal familiar to humans. The modal transformation section performs a process of transforming a far-infrared image of the region of interest to a modal image of the far-infrared image in accordance with a database where pairs of far-infrared images and visible-light images are preregistered or with a conditional probability distribution of visible-light image generation based on a far-infrared image.

Further, according to a second aspect of the technology disclosed in this document, there is provided an image processing method including a region extraction step, a modal transformation step, and a superimposition step. The region extraction step extracts a region of interest within a visible-light image captured by a visible-light camera. The modal transformation step receives an image of the region of interest within an infrared image captured by an infrared camera observing the same subject as the visible-light camera, and transforms the received image to a modal image. The superimposition step generates a presentation image by superimposing the modal image on the region of interest within the visible-light image.

Advantageous Effect of Invention

The technology disclosed in this document is able to provide an image processing apparatus and an image processing method that process far-infrared images.

It should be noted that advantageous effect described in this document are merely illustrative and not restrictive. The present invention is not limited to the above-mentioned effect. Further, in some cases, the present invention may provide additional advantageous effects in addition to the above-mentioned effect.

Other objects, features, and advantages of the technology disclosed in this document will be apparent from the following more detailed description based on a later-described embodiment and accompanying drawings.

BRIEF DESCRIPTION OF DRAWINGS

FIG. 2 is a diagram illustrating a functional configuration of an image processing apparatus 200.

FIG. 21 is a flowchart illustrating a process of generating a presentation image by superimposing modal images on regions of interest within a visible-light image.

DESCRIPTION OF EMBODIMENT

An embodiment of the technology disclosed in this document will now be described in detail with reference to the accompanying drawings.

Figure 1:
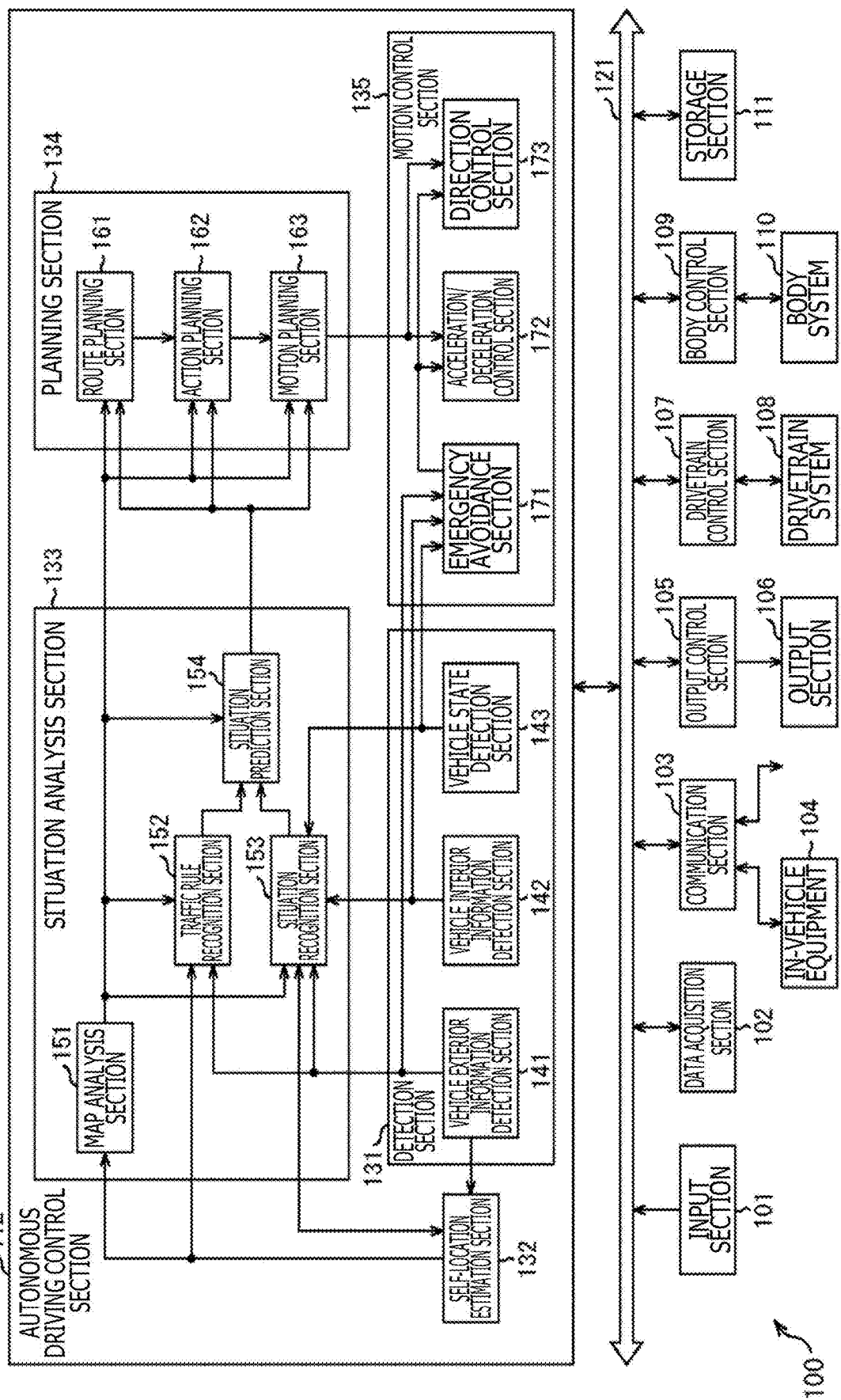
FIG. 1 is a schematic block diagram illustrating an example functional configuration of a vehicle control system 100.

FIG. 1 is a schematic block diagram illustrating an example functional configuration of a vehicle control system 100. The vehicle control system 100 is an example of a mobile body control system to which the present technology is applicable.

It should be noted that a vehicle in which the vehicle control system 100 is mounted is hereinafter referred to as a host automobile or a host vehicle in a case where it is to be distinguished from another vehicle.

The vehicle control system 100 includes an input section 101, a data acquisition section 102, a communication section 103, in-vehicle equipment 104, an output control section 105, an output section 106, a drivetrain control section 107, a drivetrain system 108, a body control section 109, a body system 110, a storage section 111, and an autonomous driving control section 112. The input section 101, the data acquisition section 102, the communication section 103, the output control section 105, the drivetrain control section 107, the body control section 109, the storage section 111, and the autonomous driving control section 112 are interconnected through a communication network 121. The communication network 121 includes, for example, an in-vehicle communication network or bus compliant with a relevant standard such as CAN (Controller Area Network), LIN (Local Interconnect Network), LAN (Local Area Network), or FlexRay (registered trademark). It should be noted that various sections of the vehicle control system 100 may be directly interconnected instead of being interconnected through the communication network 121.

In the following description, the communication network 121 is not mentioned in a case where various sections of the vehicle control system 100 establish communication through the communication network 121. For example, in a case where the input section 101 and the autonomous driving control section 112 communicate with each other through the communication network 121, the following description merely states that the input section 101 and the autonomous driving control section 112 communicate with each other.

The input section 101 includes apparatuses that a vehicle occupant uses to input, for example, various data and instructions. The input section 101 includes, for example, operating devices such as a touch panel, a button, a microphone, a switch, and a lever and operating devices capable of inputting various data and instructions by using, for example, voice or gesture instead of a manual operation. Further, the input section 101 may be, for example, a remote control apparatus based on infrared rays or other radio waves or externally connected equipment operable corresponding to the operations of the vehicle control system 100, such as mobile equipment or wearable equipment. The input section 101 generates an input signal based, for example, on data and instructions inputted by the vehicle occupant, and supplies the generated input signal to various sections of the vehicle control system 100.

The data acquisition section 102 includes, for example, various sensors for acquiring data to be subjected to processing in the vehicle control system 100, and supplies acquired data to various sections of the vehicle control system 100.

For example, the data acquisition section 102 includes various sensors for detecting, for instance, the state of the host vehicle. More specifically, the data acquisition section 102 includes, for example, a gyro sensor, an acceleration sensor, an inertial measurement unit (IMU), and a sensor for detecting, for instance, an accelerator pedal operation amount, a brake pedal operation amount, a steering wheel steering angle, an engine speed, a motor rotation speed, or a wheel rotation speed.

Further, the data acquisition section 102 includes, for example, various sensors for detecting information regarding the exterior of the host vehicle. More specifically, the data acquisition section 102 includes imaging apparatuses such as a ToF (Time Of Flight) camera, a stereo camera, a monocular camera, an infrared camera, and other cameras. Furthermore, the data acquisition section 102 includes, for example, an environmental sensor for detecting weather or other meteorological phenomena, and a peripheral information detection sensor for detecting objects around the host vehicle. The environmental sensor includes, for example, a raindrop sensor, a fog sensor, a sunlight sensor, and a snow sensor. The peripheral information detection sensor includes, for example, an ultrasonic sensor, a radar, a LiDAR (Light Detection and Ranging, Laser Imaging Detection and Ranging) device, and a sonar.

Moreover, the data acquisition section 102 includes various sensors for detecting the current location of the host vehicle. More specifically, the data acquisition section 102 includes, for example, a GNSS (Global Navigation Satellite System) receiver for receiving a GNSS signal from a GNSS satellite.

Additionally, the data acquisition section 102 includes various sensors for detecting information regarding the interior of a vehicle. More specifically, the data acquisition section 102 includes, for example, an imaging apparatus for capturing an image of a driver of the vehicle, a biosensor for detecting biological information regarding the driver, and a microphone for collecting sound in a vehicle compartment. The biosensor is disposed, for example, on the surface of a seat or on a steering wheel to detect the biological information regarding a vehicle occupant sitting on the seat or the driver holding the steering wheel.

The communication section 103 communicates, for example, with the in-vehicle equipment 104, various equipment outside the vehicle, a server, and a base station in order to transmit data supplied from various sections of the vehicle control system 100 and supply received data to various sections of the vehicle control system 100. It should be noted that a communication protocol supported by the communication section 103 is not particularly limited, and that the communication section 103 is able to support a plurality of different communication protocols.

The communication section 103 establishes wireless communication with the in-vehicle equipment 104 by using, for example, a wireless LAN, Bluetooth (registered trademark), NFC (Near Field Communication), or WUSB (Wireless USB). Further, for example, the communication section 103 establishes wired communication with the in-vehicle equipment 104 through a connection terminal (not depicted) (and, if necessary, a cable) by using, for instance, USB (Universal Serial Bus), HDMI (High-Definition Multimedia Interface), or MHL (Mobile High-definition Link).

Furthermore, the communication section 103 communicates with equipment (e.g., an application server or a control server) on an external network (e.g., the Internet, a cloud network, or a provider-specific network) through a base station or an access point. Moreover, the communication section 103 uses, for example, a P2P (Peer To Peer) technology to communicate with a terminal existing in the vicinity of the host vehicle (e.g., a terminal of a pedestrian or of a store or an MTC (Machine Type Communication) terminal). Additionally, the communication section 103 establishes V2X communication such as V2V (Vehicle to Vehicle) communication, V2I (Vehicle to Infrastructure) communication, V2H (Vehicle to Home) communication, and V2P (Vehicle to Pedestrian) communication. In addition, the communication section 103 includes a beacon reception section in order to receive radio waves or electromagnetic waves emitted, for example, from a wireless station installed on a road and acquire information regarding, for instance, the current location, traffic congestion, traffic restrictions, or required time.

The in-vehicle equipment 104 includes, for example, mobile equipment or wearable equipment possessed by a vehicle occupant, information equipment carried into or mounted in the host vehicle, and a navigation apparatus for searching for a route to a desired destination.

The output control section 105 controls the output of various information to a vehicle occupant in the host vehicle or to the outside of the host vehicle. For example, the output control section 105 controls the output of visual information and auditory information from the output section 106 by generating an output signal including at least one of visual information (e.g., image data) or auditory information (e.g., audio data) and supplying the generated output signal to the output section 106. More specifically, for example, the output control section 105 combines image data captured by different imaging apparatuses in the data acquisition section 102 to generate, for instance, a bird's-eye-view image or a panoramic image, and supplies an output signal including the generated image to the output section 106. Further, for example, the output control section 105 generates audio data including, for instance, a warning sound or warning message indicating the risk, for example, of collision, minor accident, or entry into a danger zone, and supplies an output signal including the generated audio data to the output section 106.

The output section 106 includes an apparatus capable of outputting visual information or auditory information to a vehicle occupant in the host vehicle or to the outside of the host vehicle. For example, the output section 106 includes a display apparatus, an instrument panel, an audio speaker, a headphone, an eyeglass display or other wearable device worn by the vehicle occupant, a projector, and a lamp. The display apparatus to be included in the output section 106 may be not only an apparatus having a common display, but also a head-up display, a transmission-type display, an apparatus having an AR (Augmented Reality) display function, or other apparatus displaying visual information in the field of view of the driver.

The drivetrain control section 107 generates various control signals, and supplies the generated control signals to the drivetrain system 108 in order to control the drivetrain system 108. Further, the drivetrain control section 107 supplies the control signals to various sections other than the drivetrain system 108 as needed in order to notify them of a controlled state of the drivetrain system 108.

The drivetrain system 108 includes various apparatuses related to a drivetrain of the host vehicle. For example, the drivetrain system 108 includes a driving force generation apparatus for generating a driving force, for instance, for an internal combustion engine or a drive motor, a driving force transmission mechanism for transmitting a driving force to wheels, a steering mechanism for adjusting a steering angle, a braking apparatus for generating a braking force, an ABS (Antilock Brake System), an ESC (Electronic Stability Control) apparatus, and an electric power steering apparatus.

The body control section 109 generates various control signals, and supplies the generated control signals to the body system 110 in order to control the body system 110. Further, the body control section 109 supplies the control signals to various sections other than the body system 110 as needed in order to notify them of a controlled state of the body system 110.

The body system 110 includes various body-related apparatuses mounted in a vehicle body. For example, the body system 110 includes a keyless entry system, a smart-key system, a power window apparatus, a power seat, a steering wheel, an air conditioner, and various lamps (e.g., headlamps, backup lamps, brake lamps, direction indicator lamps, and fog lamps).

The storage section 111 includes, for example, a ROM (Read Only Memory), a RAM (Random Access Memory), an HDD (Hard Disk drive) or other magnetic storage device, a semiconductor storage device, an optical storage device, and a magneto-optical storage device. The storage section 111 stores, for example, various programs and data that are used by various sections of the vehicle control system 100. For example, the storage section 111 stores map data such as a dynamic map or other high-accuracy three-dimensional map, a global map having lower accuracy and covering a wider area than the high-accuracy three-dimensional map, and a local map including information regarding an area around the host vehicle.

The autonomous driving control section 112 provides control over autonomous driving such as automatic traveling or driving assistance. More specifically, the autonomous driving control section 112 provides coordinated control to implement ADAS (Advanced Driver Assistance System) functions for the host vehicle including, for example, collision avoidance or impact mitigation, follow-up traveling based on vehicle-to-vehicle distance, cruise control, collision warning, or lane departure warning. Further, for example, the autonomous driving control section 112 provides coordinated control for autonomous driving in order to achieve automatic traveling without requiring driver intervention. The autonomous driving control section 112 includes a detection section 131, a self-location estimation section 132, a situation analysis section 133, a planning section 134, and a motion control section 135.

The detection section 131 detects various information necessary for controlling autonomous driving. The detection section 131 includes a vehicle exterior information detection section 141, a vehicle interior information detection section 142, and a vehicle state detection section 143.

The vehicle exterior information detection section 141 performs a detection process on exterior information regarding the host vehicle in accordance with data or signals from various sections of the vehicle control system 100. For example, the vehicle exterior information detection section 141 performs processes of detecting, recognizing, and tracking objects around the host vehicle, and performs a process of detecting the distance to the objects. The objects to be detected include, for example, vehicles, persons, obstacles, structures, roads, traffic lights, traffic signs, and road signs. Further, for example, the vehicle exterior information detection section 141 performs a process of detecting the environment around the host vehicle. The environment to be detected includes, for example, weather, temperature, humidity, brightness, and road surface conditions. The vehicle exterior information detection section 141 supplies data indicative of results of the detection processes, for example, to the self-location estimation section 132, to a map analysis section 151, a traffic rule recognition section 152, and a situation recognition section 153 of the situation analysis section 133, and to an emergency avoidance section 171 of the motion control section 135.

The vehicle interior information detection section 142 performs a process of detecting vehicle interior information in accordance with data or signals from various sections of the vehicle control system 100. For example, the vehicle interior information detection section 142 performs, for instance, processes of authenticating and recognizing the driver, a process of detecting the state of the driver, a process of detecting vehicle occupants, and a process of detecting an in-vehicle environment. The state of the driver that is to be detected includes, for example, physical conditions, consciousness, the degree of concentration, the degree of fatigue, and a gaze direction. The in-vehicle environment to be detected includes, for example, temperature, humidity, brightness, and odor. The vehicle interior information detection section 142 supplies data indicative of the results of the detection processes, for example, to the situation recognition section 153 of the situation analysis section 133 and to the emergency avoidance section 171 of the motion control section 135.

The vehicle state detection section 143 performs a process of detecting the state of the host vehicle in accordance with data or signals from various sections of the vehicle control system 100. The state of the host vehicle that is to be detected includes, for example, speed, acceleration, steering angle, the presence and description of abnormality, the state of a driving operation, the position and inclination of the power seat, the state of a door lock, and the state of other vehicle-mounted equipment. The vehicle state detection section 143 supplies data indicative of the result of the detection process, for example, to the situation recognition section 153 of the situation analysis section 133 and to the emergency avoidance section 171 of the motion control section 135.

The self-location estimation section 132 performs a process of estimating, for example, the location and posture of the host vehicle in accordance with data or signals from various sections of the vehicle control system 100, such as the vehicle exterior information detection section 141 and the situation recognition section 153 of the situation analysis section 133. Further, the self-location estimation section 132 generates, as needed, a local map for self-location estimation (hereinafter referred to as the self-location estimation map). The self-location estimation map is supposed to be a high-accuracy map obtained by using, for example, a SLAM (Simultaneous Localization and Mapping) technology. The self-location estimation section 132 supplies data indicative of the result of the estimation process, for example, to the map analysis section 151, the traffic rule recognition section 152, and the situation recognition section 153 of the situation analysis section 133. Moreover, the self-location estimation section 132 stores the self-location estimation map in the storage section 111.

The situation analysis section 133 performs a process of analyzing the situation around the host vehicle. The situation analysis section 133 includes the map analysis section 151, the traffic rule recognition section 152, the situation recognition section 153, and a situation prediction section 154.

The map analysis section 151 performs a process of analyzing various maps stored in the storage section 111 by using, as needed, data or signals from various sections of the vehicle control system 100, such as the self-location estimation section 132 and the vehicle exterior information detection section 141, and builds a map including information necessary for processing for autonomous driving. The map analysis section 151 supplies the built map, for example, to the traffic rule recognition section 152, the situation recognition section 153, and the situation prediction section 154, and to a route planning section 161, an action planning section 162, and a motion planning section 163 of the planning section 134.

The traffic rule recognition section 152 performs a process of recognizing traffic rules around the host vehicle in accordance with data or signals from various sections of the vehicle control system 100, such as the self-location estimation section 132, the vehicle exterior information detection section 141, and the map analysis section 151. This recognition process recognizes, for example, the locations and states of traffic lights around the host vehicle, traffic restrictions around the host vehicle, and available lanes. The traffic rule recognition section 152 supplies data indicative of the result of the recognition process, for example, to the situation prediction section 154.

The situation recognition section 153 performs a process of recognizing a situation regarding the host vehicle in accordance with data or signals from various sections of the vehicle control system 100, such as the self-location estimation section 132, the vehicle exterior information detection section 141, the vehicle interior information detection section 142, the vehicle state detection section 143, and the map analysis section 151. For example, the situation recognition section 153 performs a process of recognizing, for example, the situation of the host vehicle, the situation around the host vehicle, and the situation of the driver of the host vehicle. Further, the situation recognition section 153 generates, as needed, a local map for recognizing the situation around the host vehicle (hereinafter referred to as the situation recognition map). The situation recognition map is supposed, for example, to be an Occupancy Grid Map.

The situation of the host vehicle that is to be recognized includes, for example, the location, posture, and motion (e.g., speed, acceleration, and movement direction) of the host vehicle and the presence and description of abnormality. The situation around the host vehicle that is to be recognized includes, for example, the type and location of a nearby stationary object, the type, location, and motion of a nearby moving object (e.g., speed, acceleration, and movement direction), the configuration of nearby roads and road surface conditions, and the weather, temperature, humidity, and brightness of a surrounding area. The situation of the driver that is to be recognized includes, for example, physical conditions, consciousness, the degree of concentration, the degree of fatigue, a gaze direction, and a driving operation.

The situation recognition section 153 supplies data (including, as needed, the situation recognition map) indicative of the result of the recognition process, for example, to the self-location estimation section 132 and the situation prediction section 154. Further, the situation recognition section 153 stores the situation recognition map in the storage section 111.

The situation prediction section 154 performs a process of predicting a situation regarding the host vehicle in accordance with data or signals from various sections of the vehicle control system 100, such as the map analysis section 151, the traffic rule recognition section 152, and the situation recognition section 153. For example, the situation prediction section 154 performs a process of predicting, for instance, the situation of the host vehicle, the situation around the host vehicle, and the situation of the driver.

The situation of the host vehicle that is to be predicted includes, for example, the behavior of the host vehicle, the occurrence of abnormality, and a travelable distance. The situation around the host vehicle that is to be predicted includes, for example, the behavior of a moving object around the host vehicle, changes in the state of a traffic light, and changes in weather and other environmental factors. The situation of the driver that is to be predicted includes, for example, the behavior and physical conditions of the driver.

The situation prediction section 154 supplies data indicative of the result of the prediction process and data received from the traffic rule recognition section 152 and the situation recognition section 153, for example, to the route planning section 161, the action planning section 162, and the motion planning section 163 of the planning section 134.

The route planning section 161 plans a route to a destination in accordance with data or signals from various sections of the vehicle control system 100, such as the map analysis section 151 and the situation prediction section 154. For example, the route planning section 161 sets a route from the current location to a designated destination in accordance with the global map. Further, for example, the route planning section 161 changes a route as needed in accordance, for instance, with traffic congestion, accidents, traffic restrictions, construction work, and driver's physical conditions. The route planning section 161 supplies data indicative of a planned route, for example, to the action planning section 162.

Based on data or signals from various sections of the vehicle control system 100, such as the map analysis section 151 and the situation prediction section 154, the action planning section 162 plans an action of the host vehicle so as to travel safely within a planned time along a route planned by the route planning section 161. For example, the action planning section 162 makes a plan regarding, for instance, starting, stopping, traveling direction (e.g., forward movement, reversing, left turn, right turn, and direction change), driving lane, driving speed, and overtaking. The action planning section 162 supplies data indicative of a planned action of the host vehicle, for example, to the motion planning section 163.

Based on data or signals from various sections of the vehicle control system 100, such as the map analysis section 151 and the situation prediction section 154, the motion planning section 163 plans a motion of the host vehicle so as to implement an action planned by the action planning section 162. For example, the motion planning section 163 makes a plan regarding, for instance, acceleration, deceleration, and a traveling track. The motion planning section 163 supplies data indicative of a planned motion of the host vehicle, for example, to an acceleration/deceleration control section 172 and a direction control section 173 of the motion control section 135.

The motion control section 135 controls the motion of the host vehicle. The motion control section 135 includes the emergency avoidance section 171, the acceleration/deceleration control section 172, and the direction control section 173.

Based on the results of detection by the vehicle exterior information detection section 141, the vehicle interior information detection section 142, and the vehicle state detection section 143, the emergency avoidance section 171 performs a process of detecting an emergency such as a collision, a minor accident, entering a danger zone, a driver abnormality, and an abnormality of a vehicle. In a case where the occurrence of an emergency is detected, the emergency avoidance section 171 plans a motion of the host vehicle so as to avoid an emergency such as sudden braking or sudden turning. The emergency avoidance section 171 supplies data indicative of a planned motion of the host vehicle, for example, to the acceleration/deceleration control section 172 and the direction control section 173.

The acceleration/deceleration control section 172 provides acceleration/deceleration control for implementing a motion of the host vehicle that is planned by the motion planning section 163 or the emergency avoidance section 171. For example, the acceleration/deceleration control section 172 computes a control target value for the driving force generation apparatus or the braking apparatus so as to achieve planned acceleration, deceleration, or sudden braking, and supplies a control command indicative of the computed control target value to the drivetrain control section 107.

The direction control section 173 provides directional control for implementing a motion of the host vehicle that is planned by the motion planning section 163 or the emergency avoidance section 171. For example, the direction control section 173 computes a control target value for the steering mechanism so as to implement a traveling track or sudden turning planned by the motion planning section 163 or the emergency avoidance section 171, and supplies a control command indicative of the computed control target value to the drivetrain control section 107.

For example, a camera and a distance sensor are mounted in the vehicle control system 100 according to the present embodiment in order to prevent accidents by automatically detecting persons and other obstacles ahead of the host vehicle. More specifically, a visible-light camera and a far-infrared camera are incorporated as component elements of the data acquisition section 102 in the vehicle control system 100. In some cases, a plurality of visible-light cameras and far-infrared cameras are mounted in one vehicle. It is assumed that at least a pair of visible-light camera and far-infrared camera (e.g., a pair of cameras for observing an area ahead of a vehicle) is installed so as to observe the same subject.

Using a visible-light camera and a far-infrared camera in combination makes it possible to capture a far-infrared image including a large amount of thermal information at a long wavelength in the vicinity, for example, of ten micrometers, and extract a temperature region near a human body temperature. Therefore, persons and other obstacles can be detected from the far-infrared image even in a dark or other area hardly visible under visible light.

However, far-infrared cameras essentially differ from visible-light cameras in optical properties. Therefore, if a far-infrared image captured by a far-infrared camera is displayed as is, it is apprehended that an observer (e.g., the driver of a vehicle) may feel uncomfortable. A visible-light image captured by a visible-light camera is usually displayed as a color image. Meanwhile, a far-infrared image captured by a far-infrared camera is displayed as a monochrome image. However, many observers are unfamiliar with monochrome images. Further, far-infrared images express the temperature level of an object by using light and shade instead of high and low light intensities. Therefore, the observers may feel more uncomfortable with far-infrared images than with monochrome visible-light images.

Proposed, for example, is an image processing apparatus that attempts to display a non-uncomfortable image by combining a visible-light image captured by a visible-light camera and an infrared image captured by an infrared camera (refer, for example, to PTL 2). When an infrared image is combined with a visible-light image, it is expected that the visibility of the combined image will be higher than that of the original infrared image. However, the combined image is not the same as the visible-light image. Therefore, the combined image is not easily perceivable as compared to the visible-light image. Further, the above-mentioned image processing apparatus is configured so as to perform weighted averaging of the infrared image and the visible-light image by changing their weighting factors in accordance with the brightness of an area around a vehicle. However, the visible-light image captured at nighttime or other dark situations or in a tunnel or other dark area is inherently low in visibility. Consequently, even if such a visible-light image is combined with an infrared image, it is conceivable that the visibility of the infrared image will not improve.

In view of the above circumstances, this document will now disclose an image processing apparatus that transforms the region of a human body or other region of interest within a far-infrared image to a modal image including an information modal familiar to humans, and superimposes the modal image on a visible-light image to improve the visibility of the region of interest.

FIG. 2 schematically illustrates a functional configuration of an image processing apparatus 200 to which the technology disclosed in this document is applied. The image processing apparatus 200 may be incorporated in the vehicle control system 100 depicted in FIG. 1 as a component element, for example, of the autonomous driving control section 112.

The image processing apparatus 200 depicted in FIG. 2 inputs a far-infrared image captured by a far-infrared camera 211 and a visible-light camera captured by a visible-light camera 212. It should be noted that the far-infrared camera 211 and the visible-light camera 212 are mounted in a vehicle. It is assumed that the far-infrared camera 211 and the visible-light camera 212 are basically installed so as to observe the same subject. Further, it is conceivable that the image processing apparatus 200 may be mounted in the vehicle. In the example of FIG. 2, the far-infrared camera 211 and the visible-light camera 212 are externally connected to the image processing apparatus 200. However, it is conceivable that at least either one of the far-infrared camera 211 and the visible-light camera 212 may be integral with the image processing apparatus 200. Furthermore, it is conceivable that the far-infrared camera 211 and the visible-light camera 212 may be incorporated as component elements of the data acquisition section 102 in the vehicle control system 100 depicted in FIG. 1.

The image processing apparatus 200 includes a region extraction section 201, a modal transformation section 202, and a superimposition section 203, inputs a far-infrared image captured by the far-infrared camera 211, and transforms the region of a human body or other region of interest within the far-infrared image to a modal image including an information modal familiar to humans.

The region extraction section 201 extracts a region of interest within a far-infrared image captured by the far-infrared camera 211 or a visible-light image captured by the visible-light camera 212. Here, the region of interest is an image region where a pedestrian walking at nighttime or in a tunnel or other dark area is not easily visually recognized under visible light.

The region extraction section 201 may be configured as desired. For example, the region extraction section 201 is able to extract a specific temperature region from a far-infrared image captured by the far-infrared camera 211 as the region of interest. The specific temperature region includes pixels having values within a temperature range representative of features of a specific subject such as a human body.

Further, the region extraction section 201 may be configured so as to extract the region of interest in accordance with position information regarding a body detected by a distance sensor such as a millimeter-wave radar, a LiDAR sensor, or an ultrasonic wave sensor. Alternatively, the region extraction section 201 may be configured so as to extract a feature amount from each of the far-infrared image captured by the far-infrared camera 211 and the visible-light image captured by the visible-light camera 212 and extract the region of interest in accordance with the extracted feature amount.

The modal transformation section 202 inputs the far-infrared image captured by the far-infrared camera 211, transforms a portion corresponding to the region of interest, which is extracted by the region extraction section 201, to a modal image including an information modal familiar to humans, and outputs the modal image. A modal transformation process performed on a far-infrared image will be described in detail later.

Subsequently, the superimposition section 203 inputs the visible-light image captured by the visible-light camera 212, superimposes the modal image outputted from the modal transformation section 202 on a portion corresponding to the region of interest, which is extracted by the region extraction section 201, and outputs an image obtained by superimposition as a presentation image to be presented to a human (e.g., a driver of a vehicle).

Here, it is assumed that an image superimposition process performed by the superimposition section 203 includes a replacement process and a combination process. In the replacement process, a portion of the visible-light image that corresponds to the region of interest is entirely replaced by a modal image. The combination process performs, for example, weighted averaging of the modal image and the portion of the visible-light image, which corresponds to the region of interest, at a predetermined mixing ratio.

It should be noted that, in a case where the superimposition section 203 performs the latter process of combining the two images, the mixing ratio between the visible-light image and the modal image may be determined or controlled in accordance, for example, with the visibility of the visible-light image in the region of interest. For example, in a case where the brightness of the visible-light image in the region of interest significantly varies so that the visibility is estimated to be high, the mixing ratio of the modal image may be lowered. Meanwhile, in a case where the brightness of the visible-light image in the region of interest insignificantly varies so that the visibility is estimated to be low, the mixing ratio of the modal image may be raised.

The presentation image outputted from the image processing apparatus 200 appears, for example, on a display apparatus or instrument panel incorporated as the output section 106 of the vehicle control system 100 depicted in FIG. 1, an eyeglass display, a head-up display, a transmission-type display, an apparatus having an AR display function, or other apparatus worn by a vehicle occupant and adapted to display visual information in the field of view of the driver. For example, instead of superimposing the modal image on a visible-light image for observing the same subject as a far-infrared image, a driver's attention may be drawn by using a head-up display in such a manner as to display the modal image on a portion of a windshield that corresponds to the region of interest.

The region extraction section 201 may be configured as desired. For example, the region extraction section 201 is able to extract a specific temperature region from a far-infrared image captured by the far-infrared camera 211 as the region of interest. The specific temperature region includes pixels having values within a temperature range representative of features of a specific subject such as a human body.

Figure 3:
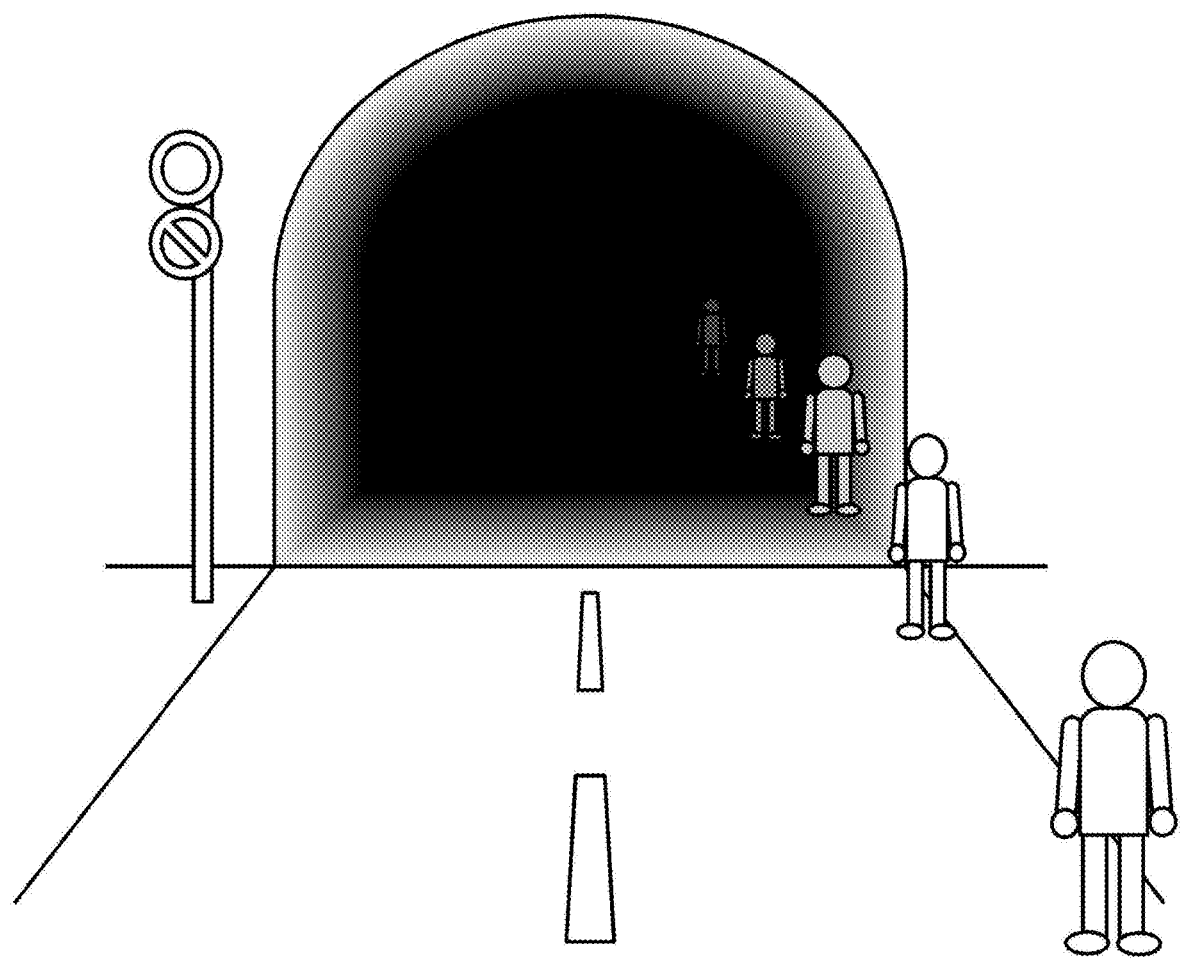
FIG. 3 is a diagram illustrating a visible-light image captured by a visible-light camera.
Figure 4:
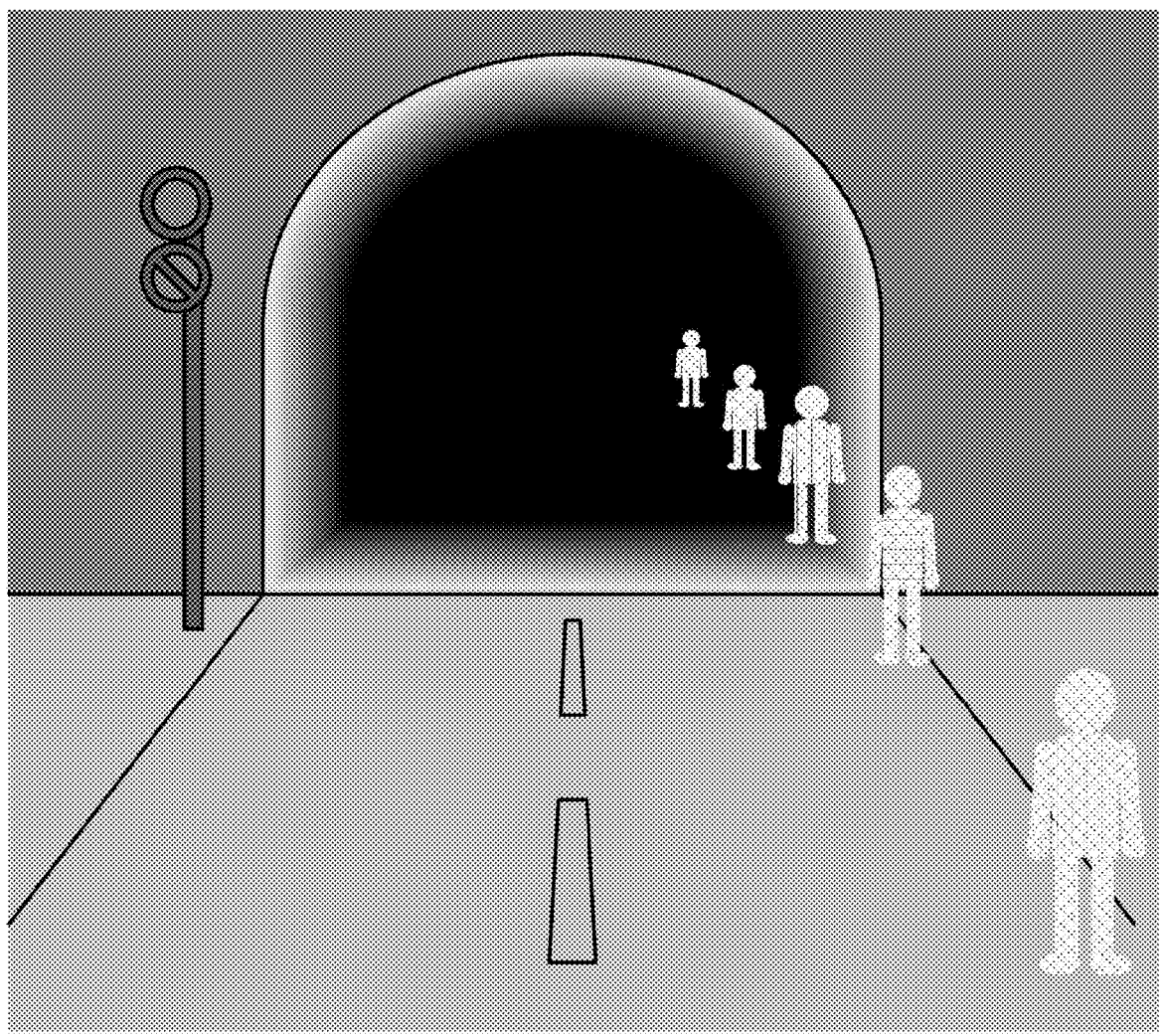
FIG. 4 is a diagram illustrating an infrared image captured by an infrared camera observing the same subject as the visible-light camera.

FIG. 3 illustrates an example of a visible-light image that is captured by the visible-light camera 212 to depict the vicinity of an exit of a tunnel. Meanwhile, FIG. 4 illustrates an example of a far-infrared image that is captured by the far-infrared camera 211 to depict the vicinity of the same exit of the tunnel. As mentioned earlier, it is assumed that the far-infrared camera 211 and the visible-light camera 212 are installed so as to observe the same subject.

Referring to FIG. 3, pedestrians walking in a bright area outside the tunnel are clearly viewable in the visible-light image and highly visible so that their presence and situation are easily understandable. Meanwhile, pedestrians walking in a dark area inside the tunnel are not clearly visible within a visible-light image so that their presence and situation are hardly understandable.

In contrast, referring to FIG. 4, it is easy to confirm the presence of all pedestrians no matter whether they are walking in a bright area outside the tunnel or in a dark area inside the tunnel. However, the far-infrared image is a monochrome image expressing the temperature level of an object by using light and shade instead of high and low light intensities. Therefore, the far-infrared image is unfamiliar to persons who are accustomed to view a visible-light image displayed in color. Consequently, it is difficult to comprehend the situation and attributes of a subject confirmed from the far-infrared image (it is difficult to determine whether the subject is a human and identify the type of a body). Further, it can be said that it is more difficult to understand the subject depicted in an infrared image than in a normal monochrome visible-light image.

Figure 5:
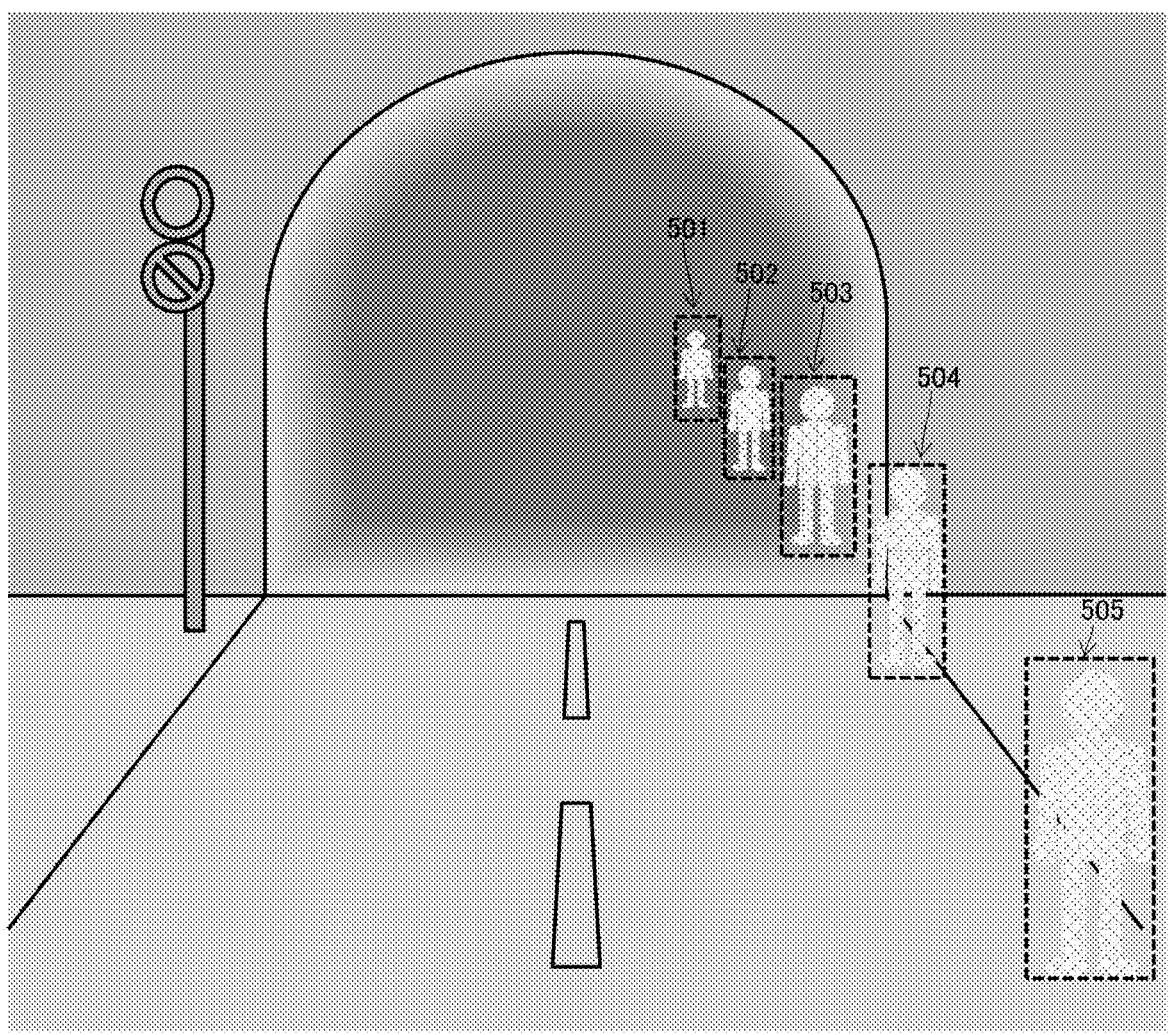
FIG. 5 is a diagram illustrating regions of interest extracted from a far-infrared image depicted in FIG. 4.

The region extraction section 201 is able to extract a specific temperature region from a far-infrared image captured by the far-infrared camera 211 as the region of interest. The specific temperature region includes pixels having values within a temperature range representative of features of a specific subject such as a human body. FIG. 5 illustrates regions of interest that are extracted from the far-infrared image depicted in FIG. 4 as specific temperature regions representative of features of human bodies designated by reference numerals 501 to 505. However, it should be understood that regions of interest similar to the regions of interest 501 to 505 can be extracted based on position information regarding bodies detected, for example, by a millimeter-wave radar, a LiDAR sensor, or an ultrasonic wave sensor.

Pedestrians in regions of interest 501 and 502, which are among extracted regions of interest 501 to 505, are walking in a dark area inside the tunnel, and are not clearly visible within a visible-light image so that their presence and situation are hardly understandable (refer to FIG. 3). Meanwhile, pedestrians in regions of interest 503 to 505 are walking in a bright area outside the tunnel, and are clearly viewable in the visible-light image and highly visible so that their presence and situation are easily understandable.

Figure 6:
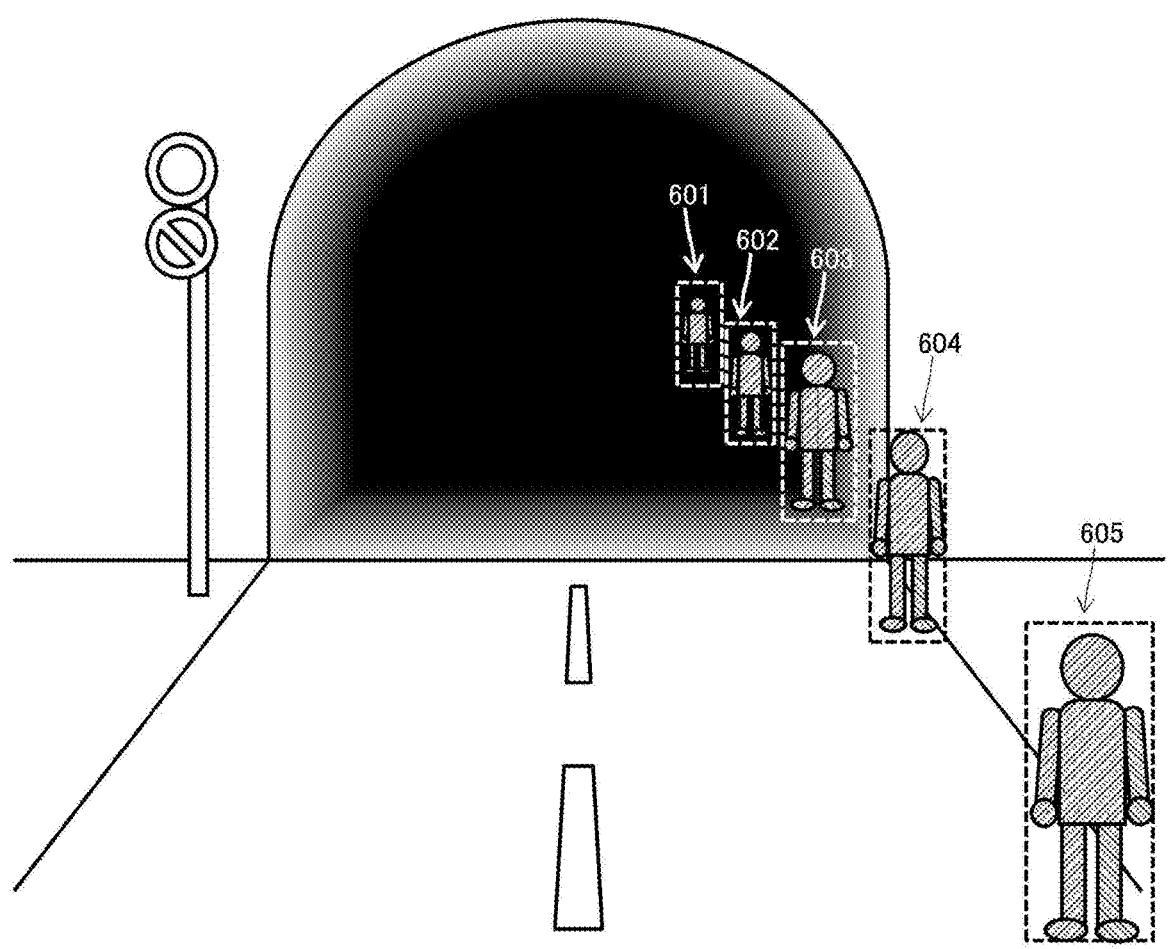
FIG. 6 is a diagram illustrating a presentation image that is obtained by superimposing modal images on all the regions of interest within the visible-light image.

FIG. 6 illustrates a presentation image that is generated by superimposing modal images, which are obtained by transforming a far-infrared image in the modal transformation section 202, on all the regions of interest 501 to 505, which are extracted from a visible-light image as specific temperature regions representative of features of human bodies.

The pedestrians in regions of interest 501 and 502 are walking in a dark area inside the tunnel. Therefore, they are not clearly visible within a visible-light image so that their presence and situation are hardly understandable (refer to FIG. 3). In view of the above circumstances, modal images 601 and 602 obtained by transforming a far-infrared image in the modal transformation section 202 are superimposed on the regions of interest 501 and 502. This provides improved visibility so that the presence and situation of a human body in each of the modal images 601 and 602 are more easily understandable than when whichever one of a visible-light image and a far-infrared image is viewed.

Meanwhile, the pedestrians in regions of interest 503 to 505 are walking in a bright area near the exit of the tunnel or outside the tunnel. Therefore, they are clearly viewable in the visible-light image. Further, they are inherently clearly visible under visible light so that their presence and situation in the regions of interest 503 to 505 can be understood with sufficient ease. Meanwhile, as depicted in FIG. 6, when modal images 603 to 605 obtained by transforming a far-infrared image in the modal transformation section 202 are superimposed on the regions of interest 503 to 505, images obtained by superimposition are lower in visibility than the original visible-light image so that the presence and situation of human bodies in the modal regions 603 to 605 are hardly understandable. The modal images each include an information modal familiar to humans, and are more clearly visible than far-infrared images. However, the modal images are unable to perfectly reproduce texture and other information included in visible-light images. Therefore, the modal images are inferior in visibility to the visible-light images.

Consequently, it can be said that the modal images should be superimposed on the regions of interest 501 and 502, which are extracted from a dark area such as an area inside a tunnel. However, the modal images should not be superimposed on the regions of interest 503 to 505, which are extracted from a bright area such as an area outside a tunnel.

In view of the above circumstances, the superimposition section 203 should check the visibility of a visible-light image in a region of interest extracted by the region extraction section 201, and perform a process of superimposing a modal image only on a dark area or other region of interest that is not clearly visible.

An alternative is to allow the region extraction section 201 to check the regional visibility of a visible-light image corresponding to a specific temperature region including pixels having values within a temperature range representative of features of a specific subject such as a human body in a far-infrared image (alternatively, a region where a body is detected on the basis of a result of detection of a distance sensor), and extract only a dark area or other region not clearly visible as the region of interest. In this case, the superimposition section 203 should perform a process of superimposing modal images on all the regions of interest extracted by the region extraction section 201.

Figure 7:
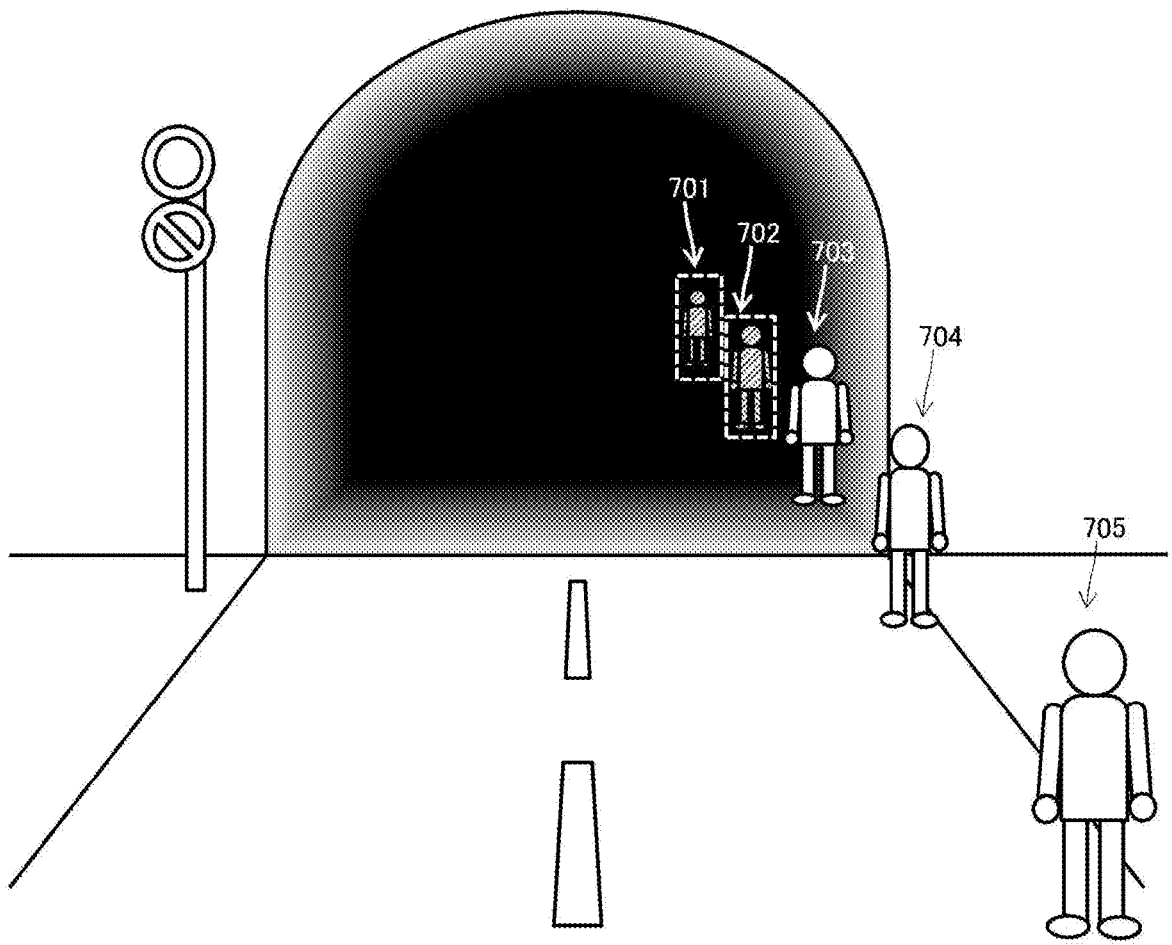
FIG. 7 is a diagram illustrating a presentation image that is obtained by superimposing modal images on the regions of interest within a dark area of the visible-light image.

FIG. 7 illustrates a presentation image that is generated by superimposing modal images only on regions of interest within a visible-light image that are extracted from a dark area or other region not clearly visible.

The pedestrians in the regions of interest 501 and 502 are walking in a dark area inside the tunnel. Therefore, they are not clearly visible within a visible-light image so that their presence and situation are hardly understandable (refer to FIG. 3). In view of such circumstances, modal images 701 and 702 obtained by transforming a far-infrared image in the modal transformation section 202 are superimposed on regions of interest 601 and 602 within a visible-light image. This provides improved visibility so that the presence and situation of a human body in each of the modal images 701 and 702 are more easily understandable than when whichever one of a visible-light image and a far-infrared image is viewed.

Meanwhile, pedestrians designated by reference numerals 703 to 705 are walking in a bright area near the exit of the tunnel or outside the tunnel. Therefore, they are clearly viewable in the visible-light image. Further, they are inherently clearly visible under visible light. Consequently, as depicted in FIG. 7, when no modal image is superimposed on regions where the pedestrians 703 to 705 are detected, texture and other information inherently included in the visible-light image are retained. As a result, the visibility remains unimpaired.

As described above, when the superimposition section 203 superimposes a modal image on a region of interest that is extracted from a dark area or other region where visibility is low, a portion hardly visible within a visible-light image can be made easily visible while a region easily visible within the visible-light image is maintained as is.

It should be noted that a broken-line frame is attached to each of regions of interest 701 and 702 in order to facilitate understanding in FIG. 7. Such a broken-line frame need not always be depicted within an actual presentation image. However, a frame for a region of interest may be displayed as depicted in FIG. 7 for the purpose of facilitating a presentation image observer (e.g., the driver) to visually confirm a location where a modal image is superimposed.

For example, when superimposing a modal image on a region of interest within a visible-light image, the superimposition section 203 is only required to attach a frame to the periphery of the modal image. Alternatively, the modal transformation section 202 may transform a region of interest within a far-infrared image to a modal image, attach a frame to the modal image, and output the framed modal image to the superimposition section 203. Another alternative is to attach an icon, a marker, or other visual indicator to the vicinity of a modal image for the purpose of indicating a location where the modal image is superimposed.

Figure 8:
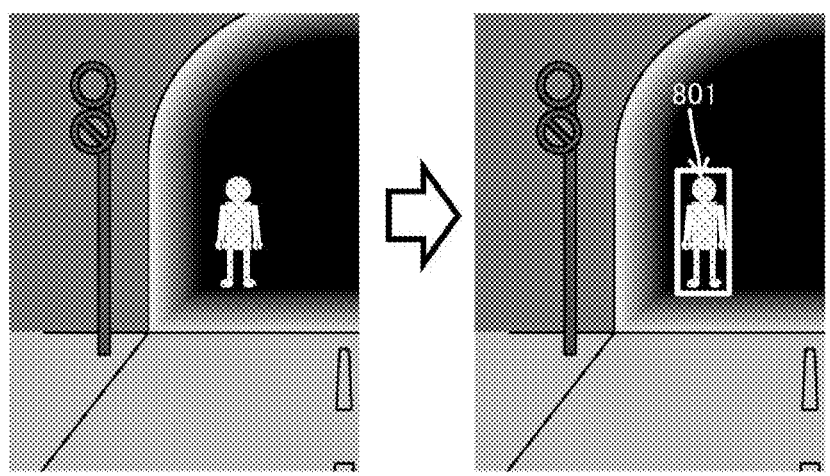
FIG. 8 is a set of diagrams illustrating an actual far-infrared image and a region of interest extracted from the far-infrared image.

FIG. 8 illustrates an actual far-infrared image and a region of interest extracted from the far-infrared image. An original far-infrared image is depicted in the left of FIG. 8. The region of interest is a region that is designated by reference numeral 801 within a far-infrared image depicted in the right of FIG. 8 and enclosed by a white-line frame. In the example of FIG. 8, a region including a human body (a pedestrian walking in a tunnel) is extracted as the region of interest 801. However, it should be noted that the image processing apparatus 200 may be configured to be capable of extracting a region including a desired body other than a human body as the region of interest.

Figure 9:
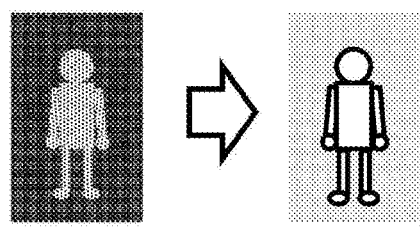
FIG. 9 is a set of diagrams illustrating a far-infrared image of the region of interest depicted in FIG. 8 and a modal image obtained by performing modal transformation on the far-infrared image of the region of interest.

Meanwhile, FIG. 9 illustrates a far-infrared image of the region of interest depicted in FIG. 8 and a modal image obtained by performing modal transformation on the far-infrared image of the region of interest. Depicted in the left of FIG. 9 is the region of interest that includes an original far-infrared image. Depicted in the right of FIG. 9 is a modal image of the region of interest that is derived from modal transformation.

The far-infrared image is a monochrome image without texture and other information included in a visible-light image. Performing modal transformation on the far-infrared image makes it possible to acceptably reproduce information such as the texture of a body surface and the outline and posture of a body. Therefore, it is expected that the visibility of the modal image will be higher than that of the far-infrared image. However, the texture and other information included in the visible-light image cannot be perfectly reproduced by modal transformation. Consequently, the modal image is inferior in visibility to the visible-light image. It should be noted that the modal transformation process on images will be described in detail later.

Figure 10:
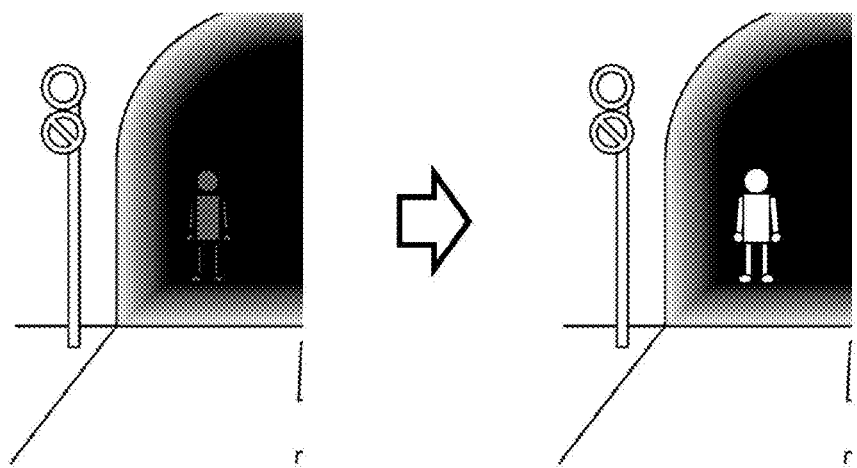
FIG. 10 is a set of diagrams illustrating a result that is produced when a modal image derived from modal transformation of a far-infrared image is superimposed on a region of interest within a visible-light image.

Incidentally, FIG. 10 illustrates a result that is obtained when a modal image generated by performing modal transformation on a far-infrared image is superimposed on a region of interest within a visible-light image. Depicted in the left of FIG. 10 is an original visible-light image that is obtained by observing the same subject as the far-infrared image depicted in the right of FIG. 8. Meanwhile, depicted in the right of FIG. 10 is a presentation image that is obtained when a modal image obtained by performing modal transformation on a far-infrared image depicted, for example, in the right of FIG. 9 is superimposed on the region of interest that is within the original visible-light image and designated by reference numeral 801 in the left of FIG. 8. However, FIG. 10 illustrates an example where the visible-light image of the region of interest is replaced by a modal image instead of combining a modal image with the region of interest within the visible-light image at a predetermined mixing ratio.

Visible light is hardly viewable in a dark area such as the inside of a tunnel. As is obvious from the left of FIG. 10, a pedestrian walking in a tunnel is not easily visually recognized from visible-light images. Further, far-infrared images include a large amount of thermal information at a long wavelength in the vicinity, for example, of ten micrometers, and, as is obvious from the left of FIG. 8, make it possible to confirm the presence of a subject having a specific temperature region in an area inside a tunnel or other dark area where visible light is not easily viewable. However, far-infrared images are monochrome images without texture and other similar information included in visible-light images. Therefore, the attributes and situation of a subject having a specific temperature region in an area inside a tunnel are not easily understandable although its presence can be confirmed. That is, the fact that the subject is a human body and walking cannot easily be comprehended simply by viewing a far-infrared image.

Modal images are images in which texture and other similar information are reproduced to a certain extent. Therefore, as depicted in the right of FIG. 10, it is easy to confirm the presence of a subject in a region of interest within a dark area that is hardly viewable under visible light. Further, as a modal image obtained by performing modal transformation on a far-infrared image is superimposed on a region of interest within a visible-light image instead of the far-infrared image, an observer (e.g., the driver of a vehicle) is able to recognize the attributes and situation of a subject existing in the region of interest far more easily than in a case where an infrared image or a visible-light image depicting a dark area is observed. When modal transformation is performed on a far-infrared image, information such as the texture of a body surface and the outline and posture of a body is reproduced to a certain extent. Therefore, it is expected that the visibility will be higher than that of the far-infrared image.

A processing method used by the region extraction section 201 to extract a region of interest will now be described in further detail. The following description deals with an example where a specific temperature region is extracted from a far-infrared image as a region of interest. The specific temperature region includes pixels having values within a temperature range representative of features of a specific subject such as a human body.

Figure 11:
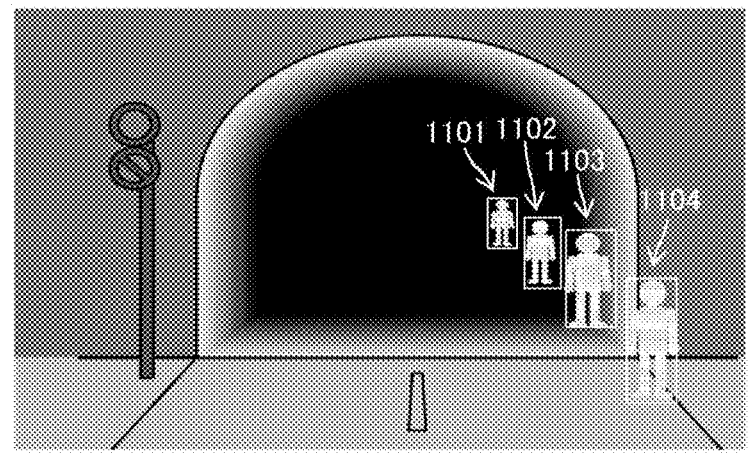
FIG. 11 is a diagram illustrating an example of a far-infrared image.
Figure 12:
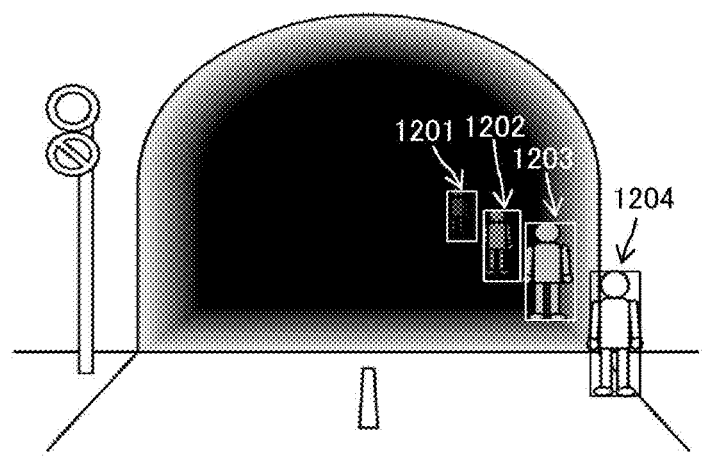
FIG. 12 is a diagram illustrating a visible-light image that is obtained when the same subject as in FIG. 11 is observed.

FIG. 11 illustrates an example of a far-infrared image captured by the far-infrared camera 211. In addition, FIG. 12 illustrates a visible-light image captured by the visible-light camera 212 that observes the same subject as the far-infrared camera 211. As depicted in FIG. 11, specific temperature regions 1101 to 1104 including pixels having values within a temperature range representative of features of a specific subject such as a human body can be extracted from the far-infrared image. Additionally, FIG. 12 depicts regions 1201 to 1204 that respectively correspond to the regions 1101 to 1104 extracted from the far-infrared image.

The regions 1203 and 1204 within the visible-light image depicted in FIG. 12 are positioned near an exit of a tunnel and in a bright area outside the tunnel. Therefore, pedestrians depicted in the regions 1203 and 1204 are clearly viewable and high in visibility so that their presence and situation are easily understandable. Meanwhile, the regions 1201 and 1202 are in a dark area inside the tunnel. Therefore, pedestrians depicted in the regions 1201 and 1202 are low in visibility so that their presence and situation are extremely difficult to understand.

In contrast, the presence of subjects depicted in the far-infrared image in FIG. 11 and positioned within all the regions 1101 to 1104 is easily confirmable no matter whether they are in a bright area outside the tunnel or in a dark area inside the tunnel. However, the far-infrared image is a monochrome image expressing the temperature level of an object by using light and shade instead of high and low light intensities. Therefore, the far-infrared image is unfamiliar to persons who are accustomed to view a visible-light image displayed in color. Consequently, it is difficult to comprehend the attributes and situation of the subjects the presence of which is confirmable from the individual regions 1101 to 1104 of the far-infrared image no matter whether they are in a bright area or in a dark area (i.e., it is difficult to visually recognize that the subjects are humans and that the humans are walking).

Figure 13:
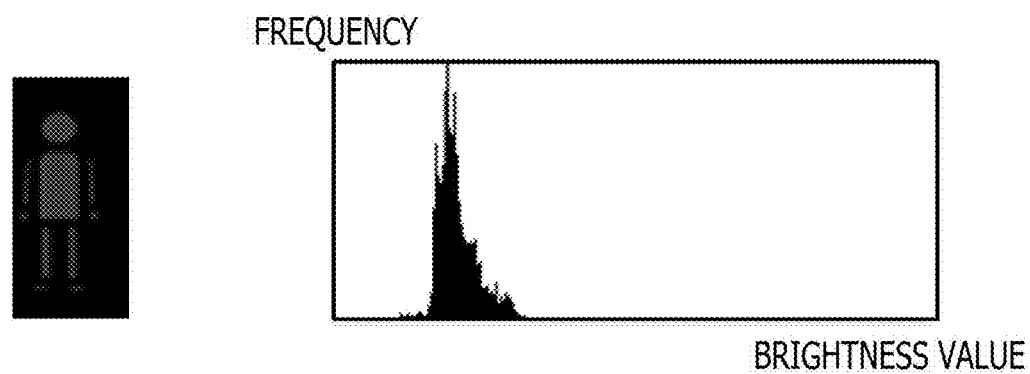
FIG. 13 is a set of diagrams illustrating a region extracted from the visible-light image (dark area) depicted in FIG. 12 and its associated brightness histogram.

FIG. 13 illustrates an enlargement of the region 1201 within a visible-light image that corresponds to the region 1101 extracted from a far-infrared image, and a brightness histogram of pixels in the region 1201. As is obvious from a comparison between FIGS. 11 and 12, the region 1101 corresponds to a dark area within a visible-light image. Therefore, the brightness histogram depicted in the right of FIG. 13 indicates a high distribution in a region where the brightness level is low (however, the horizontal axis represents a brightness value and the vertical axis represents the number of pixels of each brightness value).

Figure 14:
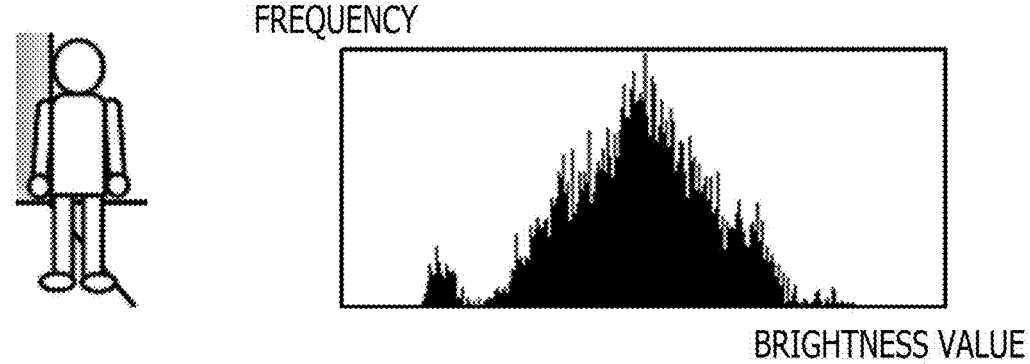
FIG. 14 is a set of diagrams illustrating a region extracted from the visible-light image (bright area) depicted in FIG. 12 and its associated brightness histogram.

Additionally, FIG. 14 illustrates an enlargement of the region 1204 within a visible-light image that corresponds to the region 1104 extracted from a far-infrared image, and a brightness histogram of pixels in the region 1204. As is obvious from a comparison between FIGS. 11 and 12, the region 1104 corresponds to a bright area within a visible-light image. Therefore, as depicted in the right of FIG. 14, the pixels are distributed over a wide range of brightness levels (however, the horizontal axis represents a brightness value and the vertical axis represents the number of pixels of each brightness value).

As is obvious from FIGS. 13 and 14, a comparison between the brightness histograms of pixels in each region of a visible-light image makes it possible to distinguish between a dark area and a bright area. For example, an intermediate value of the brightness histogram of each region may be compared with a predetermined threshold value to determine whether or not to adopt a region as the region of interest. A region where the intermediate value of a brightness histogram is smaller than the threshold value corresponds to a dark area. Therefore, such a region should be determined as the region of interest. Conversely, a region where the intermediate value of a brightness histogram is equal to or greater than the threshold value corresponds to a bright area. Therefore, such a region should not be determined as the region of interest. Obviously, an alternative method may be adopted to determine whether each region is a dark area or a bright area.

As mentioned earlier, a modal image should be superimposed on a region of interest extracted from a dark area; however, no modal image should be superimposed on a region of interest extracted from a bright area. Therefore, based on the brightness histogram of pixels in the region of interest extracted by the region extraction section 201, the superimposition section 203 determines whether a relevant region is a dark area or a bright area, and performs a modal image superimposition process only on the region of interest of a dark area. Obviously, based on an index other than the brightness histogram of pixels in the region of interest, the superimposition section 203 may determine whether the relevant region is a dark area or a bright area.

Alternatively, based on the brightness histogram of pixels in each region of a visible-light image corresponding to a specific temperature region including pixels having values within a temperature range representative of features of a specific subject such as a human body in a far-infrared image, the region extraction section 201 (not the superimposition section 203) may determine whether the relevant region is a dark area or a bright area, and extract only a region of the dark area as the region of interest. In this case, the superimposition section 203 should perform a process of superimposing modal images on all the regions of interest extracted by the region extraction section 201. Obviously, based on an index other than the brightness histogram of pixels in a region, the region extraction section 201 may determine whether the region is a dark area or a bright area.

Figure 15:
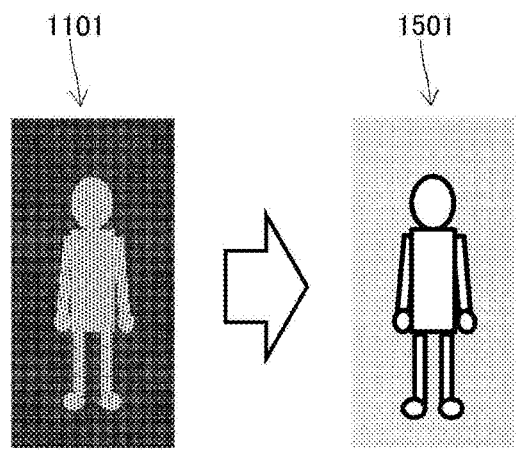
FIG. 15 is a set of diagrams illustrating a modal image that is generated by performing modal transformation on a far-infrared image of a region of interest (dark area only).

From the far-infrared image illustrated in FIG. 11, the region 1101 existing in a dark area inside the tunnel is extracted as the region of interest. FIG. 15 illustrates a modal image 1501 that is generated by performing modal transformation on a far-infrared image of the region of interest 1101.

Figure 16:
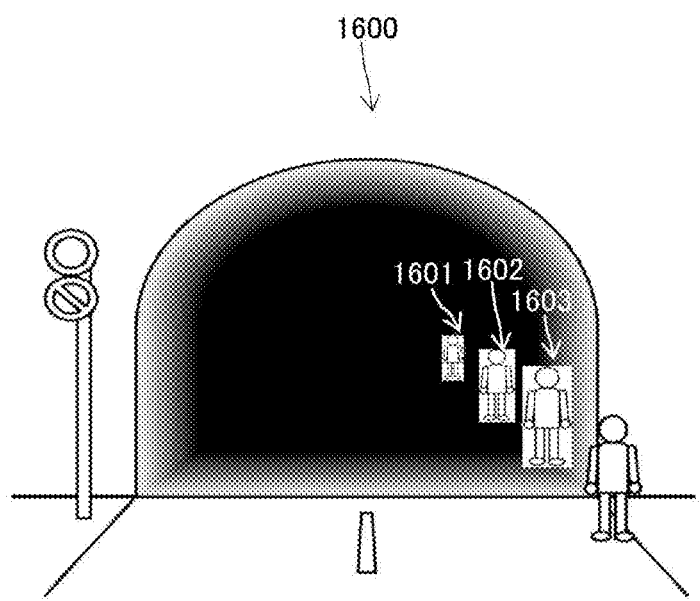
FIG. 16 is a diagram illustrating a presentation image that is generated by superimposing modal images 1601 on the regions of interest (dark area only) within the visible-light image depicted in FIG. 12.

In addition, FIG. 16 illustrates a presentation image 1600 that is generated by respectively superimposing modal images 1601 to 1603 on the corresponding regions of interest 1201 to 1203 in the visible-light image illustrated in FIG. 12. Based, for example, on the brightness histogram of pixels in the region, which is among the regions 1201 to 1204 in the visible-light image depicted in FIG. 12, the region 1204 is determined to be not a dark area, that is, not a region of interest. Therefore, based on the result of the determination, no modal image will be superimposed on such a region.

Pedestrians in the regions of interest 1201 to 1203 are walking in a dark area inside the tunnel, and thus low in visibility within a visible-light image. Therefore, their presence and situation are extremely difficult to understand (refer to FIG. 12). As such being the case, the visibility improves when the modal images 1601 to 1603 generated by transforming a far-infrared image in the modal transformation section 202 are superimposed on the regions of interest 1201 to 1203 in the visible-light image. As is obvious from FIG. 16, the presentation image 1600 is such that the presence and situation of human bodies within the modal images 1601 to 1603 are easier to understand than when the regions 1201 to 1203 within the visible-light image depicted in FIG. 12 and the regions 1101 to 1103 within the far-infrared image depicted in FIG. 11 are viewed.

Meanwhile, the pedestrian in the region designated by reference numeral 1204 in the visible-light image depicted in FIG. 12 is walking in a bright area outside the tunnel. Therefore, the pedestrian is clearly viewable in the visible-light image and is inherently highly visible under visible light. Consequently, when no modal image is superimposed on the region 1204, the presentation image 1600 is able to retain texture and other information originally included in the visible-light image and remain highly visible as depicted in FIG. 16.

Figure 17:
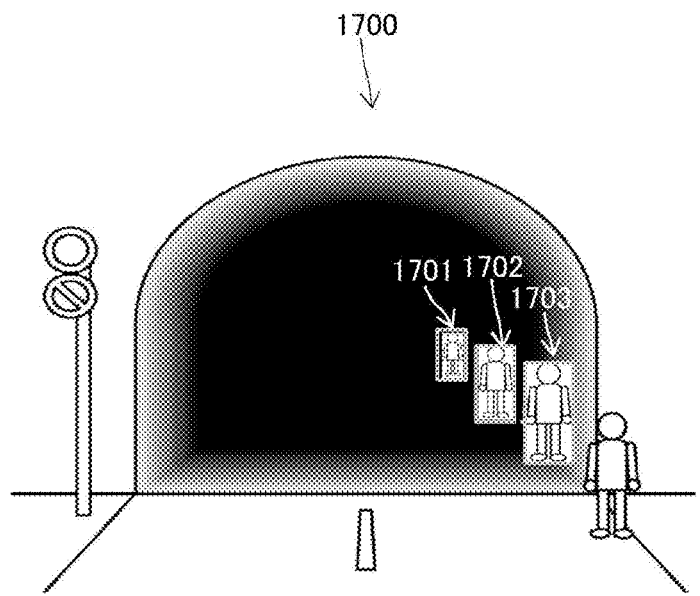
FIG. 17 is a diagram illustrating a presentation image with frame lines attached to clearly indicate modal images.

Additionally, FIG. 17 illustrates a presentation image 1700 with frames 1701 to 1703 indicative of a region-of-interest attached to regions where modal images are superimposed. As the frames 1701 to 1703 are attached to the regions of interest in the presentation image 1700, the presence of humans and other obstacles in the relevant regions can clearly be indicated to an observer (e.g., the driver of a vehicle) in order to draw the attention of the observer. Alternatively, a visual indicator other than a frame, such as an icon or a marker, may be attached to the vicinity of a modal image in order to indicate a location where the modal image is superimposed.

A processing method used by the modal transformation section 202 to transform a far-infrared image to a modal image will now be described in further detail.

The term "modal transformation" used in this document refers to a process of transforming the modal (mode) of an image. More specifically, modal transformation converts a far-infrared image to a visible-light image. Modal transformation is performed on a far-infrared image in order to acceptably reproduce the texture of a body surface, the outline and posture of a body, and other information removed from the far-infrared image, and provide visibility closer to that of a visible-light image observing the same subject.

As a modal transformation method, a method of using a modal transformation database may be adopted. Here, the modal transformation database is used to preregister pairs of far-infrared images and visible-light images.

When a far-infrared image of a region of interest is inputted, the modal transformation section 202 performs, for example, template matching to search the modal transformation database for a similar far-infrared image, locates a visible-light image paired with a retrieved far-infrared image, and outputs the visible-light image as a modal image. When preprocessing is performed to preregister an enormous number of pairs of far-infrared images and visible-light images in the modal transformation database, the modal transformation section 202 is able to perform modal transformation to a more plausible visible-light image.

As another modal transformation method, a method of learning may be adopted. For example, preprocessing may be performed to learn a conditional probability distribution for visible-light image generation based on a far-infrared image (i.e., the probability of a far-infrared image under conditions where a visible-light image arises). For example, an auto encoder (autoencoder) or Conditional Generative Adversarial Networks (CGANs) may be applied to learning.

Figure 18:
FIG. 18 is a set of diagrams illustrating a method of performing modal transformation on an image by using a conditional probability distribution.
Figure 18:
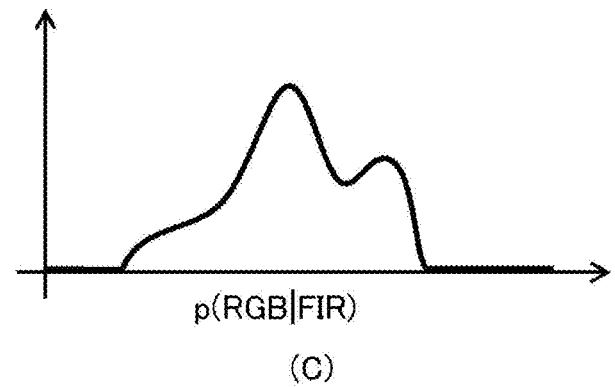

For example, the probability of a far-infrared image (FIR) depicted in FIG. 18(B) arising under conditions where a visible-light image (RGB) depicted in FIG. 18(A) arises is pre-learned. It is assumed, for example, that a curve indicative of a conditional probability distribution (p(RGB|FIR)) depicted in FIG. 18(C) is obtained.

Figure 19:
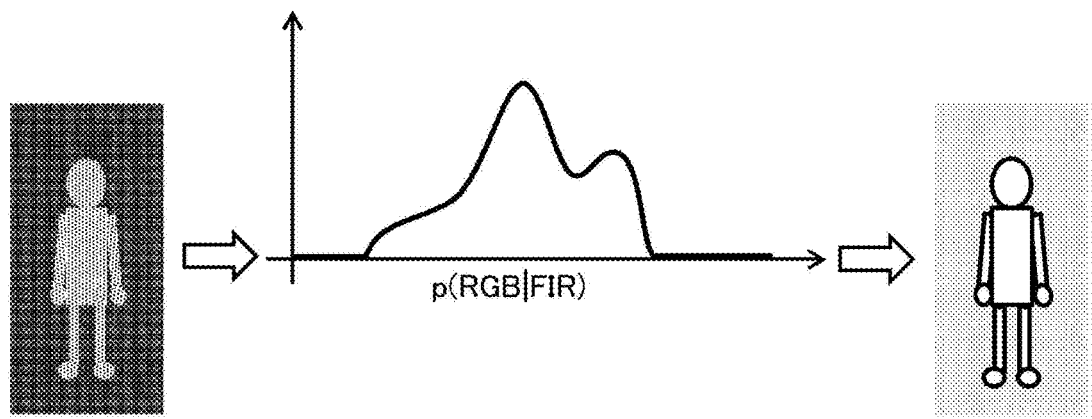
FIG. 19 is a set of diagrams illustrating a method of performing modal transformation on an image by using a conditional probability distribution.

Subsequently, the modal transformation section 202 samples a more plausible visible-light image (RGB) from the above-mentioned pre-learned conditional probability distribution (p(RGB|FIR)) based on a far-infrared image (FIR) inputted from the region extraction section 201 (refer to FIG. 19). The sampled visible-light image (RGB) is then outputted to the superimposition section 203 as a modal image.

Figure 20:
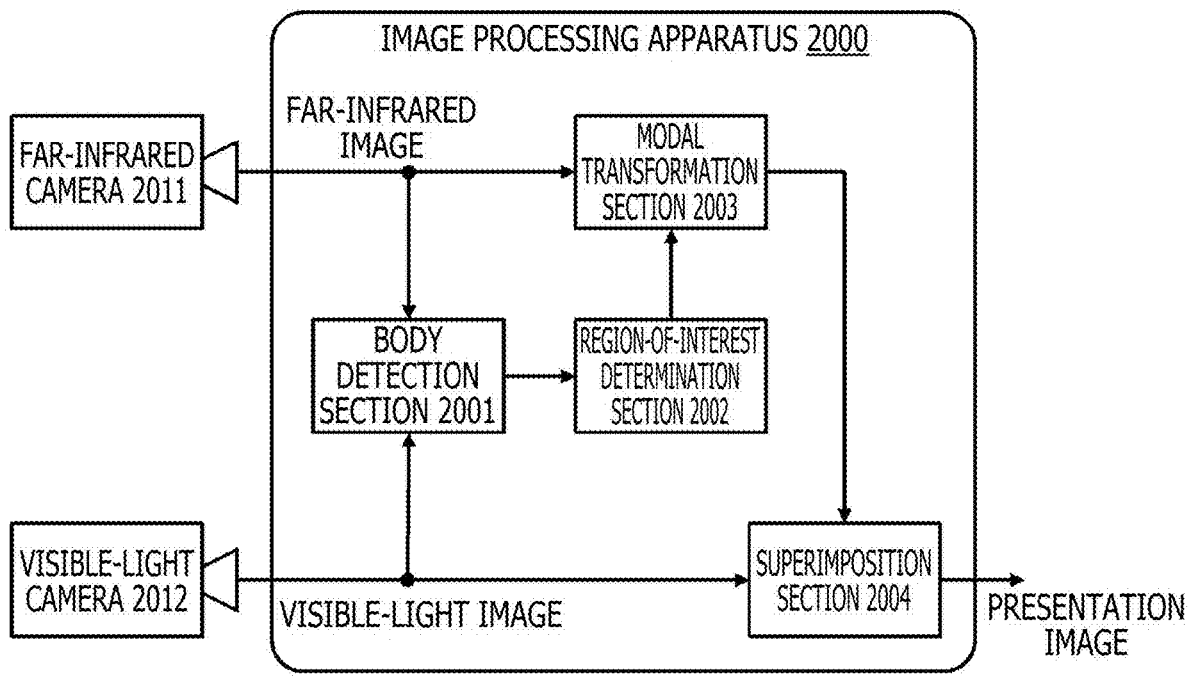
FIG. 20 is a diagram illustrating a functional configuration of an image processing apparatus 2000.

FIG. 20 schematically illustrates a functional configuration of another image processing apparatus 2000. As is the case with the image processing apparatus 200 depicted in FIG. 2, the image processing apparatus 2000 has a function of providing improved visibility by performing modal transformation on a far-infrared image to obtain a modal image, and superimposing the modal image on a region of interest that is low in visibility, such as a dark area within a visible-light image. A major difference from the image processing apparatus 200 is that the image processing apparatus 2000 extracts a region of interest on the basis of a result of body detection within a far-infrared image and a visible-light image.

The image processing apparatus 2000 depicted in FIG. 20 may be incorporated, for example, as a component element of the autonomous driving control section 112 in the vehicle control system 100 depicted in FIG. 1. Further, the image processing apparatus 2000 inputs a far-infrared image captured by a far-infrared camera 2011 and a visible-light camera captured by a visible-light camera 2012. The far-infrared camera 2011 and the visible-light camera 2012 are mounted in a vehicle.

Basically, it is assumed that the far-infrared camera 2011 and the visible-light camera 2012 are installed so as to observe the same subject. Further, it is conceivable that the image processing apparatus 2000 may also be mounted in a vehicle. In the example of FIG. 20, the far-infrared camera 2011 and the visible-light camera 2012 are externally connected to the image processing apparatus 2000. However, it is conceivable that at least either one of the far-infrared camera 2011 and the visible-light camera 2012 may be integral with the image processing apparatus 2000. Furthermore, it is conceivable that the far-infrared camera 2011 and the visible-light camera 2012 may be incorporated as component elements of the data acquisition section 102 in the vehicle control system 100 depicted in FIG. 1.

A body detection section 2001 not only extracts a feature amount from a far-infrared image captured by the far-infrared camera 2011 and detects a body depicted in the far-infrared image, but also extracts a feature amount from a visible-light image captured by the visible-light camera 2012 and detects a body depicted in the visible-light image.

A region-of-interest determination section 2002 determines whether regions including the bodies detected from the far-infrared image and the visible-light image by the body detection section 2001 are regions of interest. For example, a region including a body that is depicted in the far-infrared image but not depicted in the visible-light image is determined as a region of interest by the region-of-interest determination section 2002.

A modal transformation section 2003 inputs a far-infrared image captured by the far-infrared camera 2011, transforms a portion of the far-infrared image that corresponds to the region of interest determined by the region-of-interest determination section 2002 to a modal image including an information modal familiar to humans, and outputs the modal image.

Subsequently, a superimposition section 2004 inputs a visible-light image captured by the visible-light camera 2012, superimposes a modal image outputted from the modal transformation section 2003 on a portion of the visible-light image that corresponds to the region of interest determined by the region-of-interest determination section 2002, and outputs the result of superimposition as the presentation image to be presented to a human (e.g., the driver of a vehicle).

The presentation image outputted from the image processing apparatus 2000 appears, for example, on a display apparatus or instrument panel incorporated as the output section 106 of the vehicle control system 100 depicted in FIG. 1, an eyeglass display, a head-up display, a transmission-type display, an apparatus having an AR display function, or other apparatus worn by a vehicle occupant and adapted to display visual information in the field of view of the driver. For example, instead of superimposing the modal image on a visible-light image for observing the same subject as a far-infrared image, a driver's attention may be drawn by using a head-up display in such a manner as to display the modal image on a portion of a windshield that corresponds to the region of interest.

FIG. 21 is a flowchart illustrating a process that is performed in the image processing apparatus 200 depicted in FIG. 2 or the image processing apparatus 2000 depicted in FIG. 20 in order to generate a presentation image by superimposing modal images on regions of interest within a visible-light image.

First, a body detection process is performed to detect a region including a subject body from a visible-light image (step S2101). The body detection process is performed by the region extraction section 201 in the image processing apparatus 200, or performed by the body detection section 2001 in the image processing apparatus 2000.

Subsequently, in steps S2102 to S2104 for repetitive processing, a region-of-interest determination process is repeatedly performed on all bodies detected in step S2101 in order to determine whether a region including a body is a region of interest (step S2103).

The region-of-interest determination process in step S2103 is performed by the region extraction section 201 or the superimposition section 203 in the image processing apparatus 200, or performed by the region-of-interest determination section 2002 in the image processing apparatus 2000.

After information regarding regions of interest is acquired by the aforementioned repetitive processing in steps S2102 to S2104 (step S2105), a modal transformation process (step S2107) and a superimposition process (step S2108) are repeatedly performed on all the regions of interest in succeeding steps S2106 to S2109. The modal transformation process transforms a far-infrared image of a region of interest to a modal image. The superimposition process superimposes the modal image on a region of interest within a visible-light image.

The modal transformation process in step S2107 is performed by the modal transformation section 202 in the image processing apparatus 200, or performed by the modal transformation section 2003 in the image processing apparatus 2000. Further, the superimposition process in step S2108 is performed by the superimposition section 203 in the image processing apparatus 200, or performed by the superimposition section 2004 in the image processing apparatus 2000.

Subsequently, the image processing apparatus 200 or the image processing apparatus 2000 outputs a presentation image that is obtained by superimposing the modal image on a region of interest within the visible-light image, and performs a display process (step S2101).

The presentation image appears, for example, on a display apparatus or instrument panel incorporated as the output section 106 of the vehicle control system 100 depicted in FIG. 1, an eyeglass display, a head-up display, a transmission-type display, an apparatus having an AR display function, or other apparatus worn by a vehicle occupant and adapted to display visual information in the field of view of the driver.

When the vehicle occupant, such as the driver, observes the presentation image, the vehicle occupant is able to easily visually recognize, for example, a pedestrian in a dark area and suitably perform a driving operation to avoid a collision or prevent an accident.

INDUSTRIAL APPLICABILITY

The technology disclosed in this document has been described in detail with reference to a specific embodiment. However, it is obvious that the embodiment may be modified or changed by persons skilled in the art without departing from the spirit of the technology disclosed in this document.

The technology disclosed in this document is applicable to various vehicles such as automobiles (including gasoline vehicles and diesel vehicles), electric vehicles, hybrid electric vehicles, motorcycles, bicycles, and personal mobility vehicles. Further, the technology disclosed in this document is also applicable to mobile bodies other than road-running vehicles.

Furthermore, the technology disclosed in this document is also applicable to non-mobile bodies. When the technology disclosed in this document is applied, for example, to a surveillance camera, a real image of a suspicious person can accurately be obtained by combining a visible-light image with a modal image.

In short, the technology disclosed in this document has been described in an illustrative manner. Therefore, the description in this document should not be interpreted in a restrictive manner. The scope of appended claims should be considered in order to understand the essentials of the technology disclosed in this document.

It should be noted that the technology disclosed in this document may adopt the following configurations.

(1)

An image processing apparatus including:

a region extraction section that extracts a region of interest within a visible-light image captured by a visible-light camera;

a modal transformation section that receives an image of the region of interest within an infrared image captured by an infrared camera observing the same subject as the visible-light camera, and transforms the received image to a modal image; and a superimposition section that generates a presentation image by superimposing the modal image on the region of interest within the visible-light image.

(2)

The image processing apparatus as described in (1) above, in which the region extraction section extracts the region of interest on the basis of a result of body detection from the far-infrared image.

(3)

The image processing apparatus as described in (1) above, in which the region extraction section extracts, as the region of interest, a specific temperature region including pixels having values within a temperature range representative of features of a specific subject from the far-infrared image.

(4)

The image processing apparatus as described in (1) above, in which the region extraction section extracts the region of interest on the basis of results of body detection from the far-infrared image and from the visible-light image.

(5)

The image processing apparatus as described in (4) above, in which the region extraction section extracts, as the region of interest, a region including a body that is depicted in the far-infrared image but not depicted in the visible-light image.

(6)

The image processing apparatus as described in any one of (1) to (3) above, in which the region extraction section determines, based on a brightness histogram of a visible-light image in a region where a body is detected from the far-infrared image or the visible-light image, whether or not the region includes a region of interest.

(7)

The image processing apparatus as described in any one of (1) to (5) above, in which the modal transformation section transforms a far-infrared image of the region of interest to a modal image including an information modal familiar to humans.

(8)

The image processing apparatus as described in any one of (1) to (7) above, in which the modal transformation section transforms a far-infrared image of the region of interest to a modal image by using a database where pairs of far-infrared images and visible-light images are preregistered.

(9)

The image processing apparatus as described in any one of (1) to (7) above, in which the modal transformation section transforms a far-infrared image of the region of interest to a modal image in accordance with a conditional probability distribution of visible-light image generation based on a far-infrared image.

(10)

The image processing apparatus as described in (1) above, in which the superimposition section attaches a region-indicating frame or other visual indicator to a modal image superimposed on the visible-light image.

(11)

The image processing apparatus as described in any one of (1) to (10) above, further including:

a presentation section that presents the presentation image.

(12)

The image processing apparatus as described in any one of (1) to (11) above, in which the visible-light camera and the far-infrared camera are mounted on a predetermined mobile body.

(13)

The image processing apparatus as described in any one of (1) to (12) above, further including:

the visible-light camera and the far-infrared camera.

(14)

The image processing apparatus as described in any one of (1) to (13) above, in which the image processing apparatus is mounted on the mobile body.

(15)

An image processing method including:

a region extraction step of extracting a region of interest within a visible-light image captured by a visible-light camera;

a modal transformation step of receiving an image of the region of interest within an infrared image captured by an infrared camera observing the same subject as the visible-light camera, and transforming the received image to a modal image; and a superimposition step of generating a presentation image by superimposing the modal image on the region of interest within the visible-light image.

(16)

A computer program written in a computer-readable form for causing a computer to function as:

a region extraction section that extracts a region of interest within a visible-light image captured by a visible-light camera;

a modal transformation section that receives an image of the region of interest within an infrared image captured by an infrared camera observing the same subject as the visible-light camera, and transforms the received image to a modal image; and a superimposition section that generates a presentation image by superimposing the modal image on the region of interest within the visible-light image.

REFERENCE SIGNS LIST

100 . . . Vehicle control system
101 . . . Input section, 102 . . . Data acquisition section, 103 . . . Communication section
104 . . . In-vehicle equipment, 105 . . . Output control section, 106 . . . Output section
107 . . . Drivetrain control section, 108 . . . Drivetrain system
109 . . . Body control section, 110 . . . Body system,
111 . . . Storage section
112 . . . Autonomous driving control section,
121 . . . Communication network
131 . . . Detection section, 132 . . . Self-location estimation section, 133 . . . Situation analysis section
134 . . . Planning section, 135 . . . Motion control section
141 . . . Vehicle exterior information detection section, 142 . . . Vehicle interior information detection section
143 . . . Vehicle state detection section
151 . . . Map analysis section, 152 . . . Traffic rule recognition section
153 . . . Situation recognition section,
154 . . . Situation prediction section
161 . . . Route planning section, 162 . . . Action planning section, 163 . . . Motion planning section
171 . . . Emergency avoidance section,
172 . . . Acceleration/deceleration control section,
173 . . . Direction control section
200 . . . Image processing apparatus
201 . . . Region extraction section, 202 . . . Modal transformation section, 202 . . . Superimposition section
211 . . . Far-infrared camera, 212 . . . Visible-light camera
2000 . . . Image processing apparatus
2001 . . . Body detection section, 2002 . . . Region-of-interest determination section
2003 . . . Modal transformation section,
2004 . . . Superimposition section
2011 . . . Far-infrared camera, 2012 . . . Visible-light camera

The invention claimed is:

1. An image processing apparatus comprising:
processing circuitry; and
a memory storing a program to cause the processing circuitry to
extract a plurality sets of region of interest within a visible-light image captured by a visible-light camera, each of the plurality sets of region of interest having a different level of visibility,
receive an infrared image including the plurality sets of the region of interest captured by an infrared camera observing a same subject as the visible-light camera,
transform the infrared image including the plurality sets of the region of interest to a plurality of modal images each corresponding to each of the plurality sets of the region of interest, and
generate a presentation image by superimposing the plurality of modal images on the plurality sets of the region of interest within the visible-light image respectively, by weighted averaging of the plurality of modal images and the corresponding sets of the region of interest within the visible-light image at a respective mixing ratio, the respective mixing ratio being adjusted based on the level of visibility of each of the plurality sets of the region of interest within visible-light image.

2. The image processing apparatus according to claim 1, wherein
the processing circuitry extracts the plurality sets of the region of interest on a basis of a result of body detection from the far-infrared image.

3. The image processing apparatus according to claim 1, wherein
the processing circuitry extracts, as the plurality sets of region of interest, a specific temperature region including pixels having values within a temperature range representative of features of a specific subject from the far-infrared image.

4. The image processing apparatus according to claim 1, wherein
the processing circuitry determines, based on a brightness histogram of a visible-light image in a region where a body is detected from the far-infrared image or the visible-light image, whether or not the region includes at least one of the plurality sets of the region of interest.

5. The image processing apparatus according to claim 1, wherein
the processing circuitry transforms a far-infrared image of the plurality sets of the region of interest to the plurality of modal images including an information modal familiar to humans.

6. The image processing apparatus according to claim 1, wherein
the processing circuitry transforms a far-infrared image of the plurality sets of the region of interest to the plurality of modal images by using a database where pairs of far-infrared images and visible-light images are preregistered.

7. The image processing apparatus according to claim 1, wherein
the processing circuitry attaches a region-indicating frame or other visual indicator to at least one of the plurality of modal images superimposed on the visible-light image.

8. The image processing apparatus according to claim 1, wherein
the visible-light camera and the far-infrared camera are mounted on a predetermined mobile body.

9. The image processing apparatus according to claim 1, further comprising:
the visible-light camera and the far-infrared camera.

10. The image processing apparatus according to claim 1, wherein
the image processing apparatus is mounted on the mobile body.

11. The image processing apparatus according to claim 1, wherein
the processing circuitry extracts the plurality sets of the region of interest on a basis of results of body detection from the far-infrared image and from the visible-light image.

12. The image processing apparatus according to claim 11, wherein
the processing circuitry extracts, as the plurality sets of the region of interest, a region including a body that is depicted in the far-infrared image but not depicted in the visible-light image.

13. The image processing apparatus according to claim 1, wherein
the processing circuitry transforms a far-infrared image of the plurality sets of the region of interest to the plurality of modal images in accordance with a conditional probability distribution of visible-light image generation based on a far-infrared image.

14. The image processing apparatus according to claim 13,
wherein the processing circuitry performs learning process of the conditional probability distribution of visible-light image generation,
transforms the far-infrared image of the plurality sets of the region of interest to the plurality of modal images based on a result of the learning process of the conditional probability distribution of visible-light image generation.

15. The image processing apparatus according to claim 14,
wherein the result of the learning process of the conditional probability distribution of visible-light image generation is a curve indicative of the conditional probability distribution of the visible-light image and a far-infrared image so that an optimized visible-light image can be retrieved from the far-infrared image.

16. The image processing apparatus according to claim 1, further comprising:
a display that presents the presentation image.

17. The image processing apparatus according to claim 16,
wherein the display includes at least one of an eyeglass display, a head-up display, a transmission-type display, an AR display, or a vehicle mounted display providing visual information in a field of view of a driver.

18. The image processing apparatus according to claim 17,
wherein the processing circuitry outputs the modal image that corresponds to the plurality sets of the region of interest on a portion of a windshield of the vehicle, instead of superimposing each of the plurality of modal images on each of corresponding the plurality sets of the region of interest within the visible-light image.

19. An image processing method comprising:
extracting a plurality sets of region of interest within a visible-light image captured by a visible-light camera, each of the plurality sets of region of interest having a different level of visibility;
receiving an infrared image including the plurality sets of the region of interest captured by an infrared camera observing a same subject as the visible-light camera;
transforming the infrared image including the plurality sets of the region of interest to a plurality of modal images each corresponding to each of the plurality sets of the region of interest; and
generating a presentation image by superimposing the plurality of modal images on the plurality sets of the region of interest within the visible-light image respectively, by weighted averaging of the plurality of modal images and the corresponding sets of the region of interest within the visible-light image at a respective mixing ratio, the respective mixing ratio being adjusted based on the level of visibility of each of the plurality sets of the region of interest within visible-light image.

20. The image processing apparatus according to claim 1, wherein
the processing circuitry adjusts the respective mixing ratio as a first value in a case that the level of visibility of the respective set of the region of interest is estimated to be high, the respective modal image being mixed with the visible-light image at the first value, and
the processing circuitry adjusts the respective mixing ratio as a second value in a case that the level of visibility of the respective set of the region of interest is estimated to be low, the respective modal image being mixed with the visible-light image at the second value which is larger than the first value.

* * * * *